United States Patent
Lee et al.

(10) Patent No.: US 12,345,981 B2
(45) Date of Patent: Jul. 1, 2025

(54) BACKLIGHT UNIT, DISPLAY DEVICE AND DRIVING METHOD

(71) Applicant: LG Display Co., Ltd., Seoul (KR)

(72) Inventors: Changwoo Lee, Paju-si (KR); SunYoon Kim, Seoul (KR); Min Kim, Seoul (KR); Sanggoo Jeong, Paju-si (KR); Juyoung Noh, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 37 days.

(21) Appl. No.: 18/520,302

(22) Filed: Nov. 27, 2023

(65) Prior Publication Data

US 2024/0210758 A1   Jun. 27, 2024

(30) Foreign Application Priority Data

Dec. 27, 2022   (KR) .......................... 10-2022-0186422
Jun. 2, 2023   (KR) .......................... 10-2023-0071416

(51) Int. Cl.
*G02F 1/13357*   (2006.01)
*G02F 1/1335*   (2006.01)
*G09G 3/32*   (2016.01)

(52) U.S. Cl.
CPC .. *G02F 1/133612* (2021.01); *G02F 1/133603* (2013.01); *G09G 3/32* (2013.01); *G09G 2300/0842* (2013.01); *G09G 2310/027* (2013.01); *G09G 2310/0286* (2013.01); *G09G 2310/0297* (2013.01)

(58) Field of Classification Search
None
See application file for complete search history.

(56) References Cited

U.S. PATENT DOCUMENTS

2010/0148679 A1* 6/2010 Chen ...................... H05B 45/46
  315/297
2021/0337642 A1* 10/2021 Wang ................... G09G 3/3426

* cited by examiner

*Primary Examiner* — Christopher J Kohlman
(74) *Attorney, Agent, or Firm* — Fenwick & West LLP

(57) ABSTRACT

The present disclosure relates to a backlight unit, a display device, and a driving method. A sensing MUX circuit senses a voltage of a first light emitting node and a voltage of a second light emitting node, and then, detects whether a first light source connected between the first light emitting node and the second light emitting node is defective, whereby it is possible to specify and detect a defective light source.

24 Claims, 23 Drawing Sheets

BACKLIGHT UNIT, DISPLAY DEVICE AND DRIVING METHOD

CROSS-REFERENCE TO RELATED APPLICATIONS

This application claims the benefit of Republic of Korea Patent Application No. 10-2022-0186422 filed on Dec. 27, 2022, and Republic of Korea Patent Application No. 10-2023-0071416 filed on Jun. 2, 2023, which are hereby incorporated by reference in their entirety.

BACKGROUND

Field

Embodiments of the present disclosure relate to a backlight unit, a display device, and a driving method.

Description of Related Art

As the information society develops, demands for display devices for displaying an image are increasing in various forms, and various display devices such as a liquid crystal display device and an organic light emitting display device have been used.

The liquid crystal display device may display a desired image by supplying data signals according to image information individually to pixels arranged in a matrix form and thereby adjusting the light transmittance of the corresponding pixels.

The liquid crystal display device requires a backlight unit because a display panel does not emit light by itself, and an image may be displayed by adjusting the transmittance of light entering the display panel.

The backlight unit may include a plurality of light sources. The plurality of light sources may be divided into a plurality of light source arrays as a predetermined unit number of light sources are connected in a line.

A defect may occur in the plurality of light source arrays.

When a defect occurs in at least one light source included in a light source array, there is a problem in that the entire corresponding light source array should be replaced even though the corresponding light source array includes normal light sources.

SUMMARY

Embodiments of the present disclosure are directed to providing a backlight unit, a display device, and a driving method thereof capable of specifying and detecting a defective light source in a light source array.

Embodiments of the present disclosure are directed to providing a backlight unit, a display device, and a driving method thereof capable of recycling a light source array including a defective light source.

Embodiments of the present disclosure may provide a display device including: a backlight unit configured to emit light to a display panel; and a data driver circuit configured to drive the backlight unit, wherein the backlight unit includes a light source array including a first light source which is electrically connected between a first light emitting node and a second light emitting node; and a light source driver circuit for driving the light source array, and wherein the light source driver circuit includes a driving transistor electrically connected between the light source array and a driving voltage node to which a driving voltage is supplied; and a sensing multiplexer (MUX) circuit electrically connected to the first light emitting node and the second light emitting node.

Embodiments of the present disclosure may provide a backlight unit including: a light source array including a first light source which is electrically connected between a first light emitting node and a second light emitting node; and a light source driver circuit for driving the light source array, wherein the light source driver circuit includes a driving transistor electrically connected between the light source array and a driving voltage node to which a driving voltage is supplied; and a sensing MUX circuit electrically connected to the first light emitting node and the second light emitting node.

Embodiments of the present disclosure may provide a method for driving a display device, including: select signal supply step of supplying a select signal to a sensing MUX circuit which is electrically connected to a first light emitting node and a second light emitting node; input line select step of selecting a specific input line among a plurality of input lines included in the sensing MUX circuit according to the select signal; light emitting node voltage sensing step in which the sensing MUX circuit senses a voltage of a light emitting node through the specific input line; and defective light source determining step of determining whether a first light source connected between the first light emitting node and the second light emitting node included in a light source array is a defective light source, on the basis of a voltage of the first light emitting node and a voltage of the second light emitting node sensed in the light emitting node voltage sensing step.

Embodiments of the present disclosure may provide a display device including: a backlight unit configured to emit light to a display panel; and a data driver circuit configured to drive the backlight unit, wherein the backlight unit includes a light source array including a first light source which is electrically connected between a first light emitting node and a second light emitting node; and a light source driver circuit for driving the light source array, and wherein the light source driver circuit includes a scan transistor configured to control supply of a light emitting data voltage; a driving transistor whose gate node is electrically connected to the scan transistor; a first sensing transistor electrically connected to the first light emitting node; and a second sensing transistor electrically connected to the second light emitting node.

According to the embodiments of the present disclosure, it is possible to provide a backlight unit, a display device, and a driving method thereof capable of specifying and detecting a defective light source in a light source array.

According to the embodiments of the present disclosure, it is possible to provide a backlight unit, a display device, and a driving method thereof capable of recycling a light source array including a defective light source.

BRIEF DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
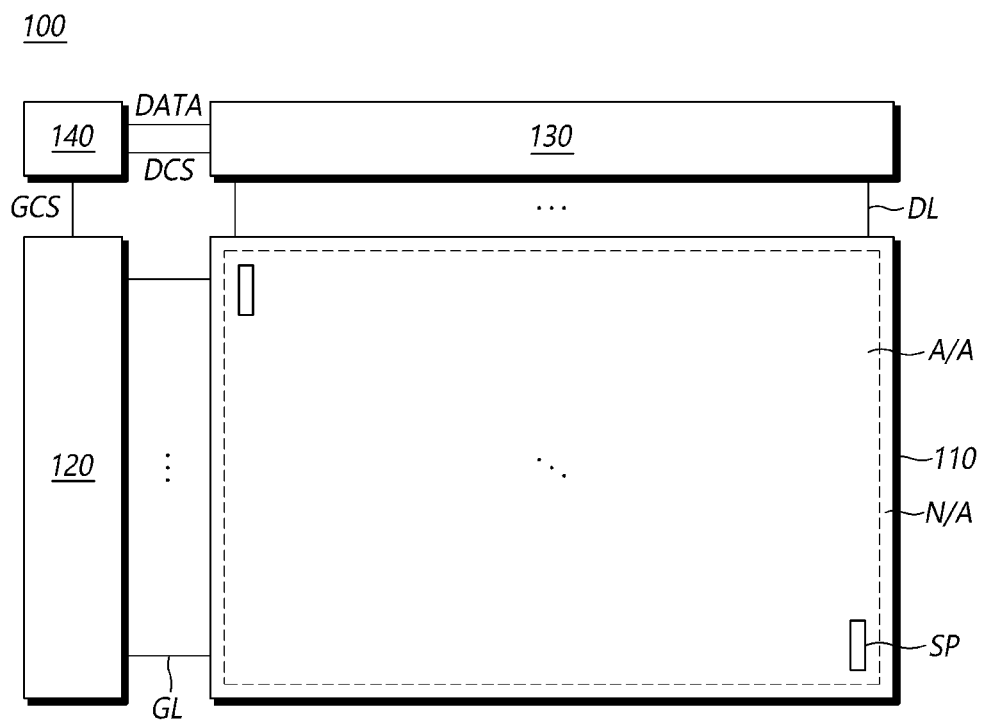
FIG. 1 is a diagram illustrating the schematic configuration of a display device in accordance with embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

FIG. 1 is a diagram illustrating the schematic configuration of a display device 100 in accordance with embodiments of the present disclosure.

Referring to FIG. 1, the display device 100 may include a display panel 110 which includes a display area A/A and a non-display area N/A, and a gate driver circuit 120, a data driver circuit 130 and a controller 140 for driving the display panel 110.

In the display panel 110, a plurality of gate lines GL and a plurality of data lines DL may be disposed, and subpixels SP may be located at areas where the gate lines GL and the data lines DL intersect with each other.

The gate driver circuit 120 may be controlled by the controller 140, and may sequentially output a scan signal to the plurality of gate lines GL disposed in the display panel 110 to control driving timings of the plurality of subpixels SP.

The gate driver circuit 120 may include at least one gate driver integrated circuit (GDIC), and may be located on one side or both sides of the display panel 110 depending on a driving scheme.

Each gate driver integrated circuit (GDIC) may be connected to bonding pads of the display panel 110 in a tape automated bonding (TAB) method or a chip-on-glass (COG) method, or may be directly disposed in the display panel 110 by being implemented in a gate-in-panel (GIP) type. As the case may be, each gate driver integrated circuit (GDIC) may be disposed in the display panel 110 by being integrated thereinto. Alternatively, each GDIC may be implemented in a chip-on-film (COF) method in which the GDIC is mounted on a film connected to the display panel 110.

The data driver circuit 130 receives image data DATA from the controller 140, and converts the image data DATA into a data voltage of an analog type. The data driver circuit 130 may output the data voltage to each data line DL at a timing when the scan signal is applied through the gate line GL, to allow each subpixel SP to represent brightness according to the image data.

The data driver circuit 130 may include at least one source driver integrated circuit (SDIC).

Each SDIC may include a shift register, a latch circuit, a digital-to-analog converter, an output buffer, and so on.

Each source driver integrated circuit (SDIC) may be connected to bonding pads of the display panel 110 in a tape automated bonding (TAB) method or a chip-on-glass (COG) method, or may be directly disposed in the display panel 110. As the case may be, each source driver integrated circuit (SDIC) may be disposed in the display panel 110 by being integrated thereinto. Alternatively, each source driver integrated circuit (SDIC) may be implemented in a chip-on-film (COF) method. In this case, each source driver integrated circuit (SDIC) may be mounted on a film which is connected to the display panel 110, and may be electrically connected to the display panel 110 through wirings on the film.

The controller 140 may supply various control signals to the gate driver circuit 120 and the data driver circuit 130, and may control operations of the gate driver circuit 120 and the data driver circuit 130.

The controller 140 may be mounted on a printed circuit board, a flexible printed circuit or the like, and may be electrically connected to the gate driver circuit 120 and the data driver circuit 130 through the printed circuit board, the flexible printed circuit or the like.

The controller 140 may cause the gate driver circuit 120 to output the scan signal at a timing implemented in each frame. The controller 140 may convert image data received from the outside, in conformity with a data signal format used in the data driver circuit 130, and may output the converted image data to the data driver circuit 130.

The controller 140 may receive various timing signals, including a vertical synchronization signal VSYNC, a horizontal synchronization signal HSYNC, an input data enable signal DE, a clock signal CLK and so on, together with the image data from the outside (e.g., a host system).

The controller 140 may generate the various control signals using the various timing signals received from the outside, and may output the various control signals to the gate driver circuit 120 and the data driver circuit 130.

For example, in order to control the gate driver circuit 120, the controller 140 may output various gate control signals GCS including a gate start pulse GSP, a gate shift clock GSC, a gate output enable signal GOE and so on.

The gate start pulse GSP controls the operation start timing of the at least one GDIC which constitutes the gate driver circuit 120. The gate shift clock GSC, as a clock signal which is inputted in common to the at least one GDIC, controls the shift timing of the scan signal. The gate output enable signal GOE specifies the timing information of the at least one GDIC.

Further, in order to control the data driver circuit 130, the controller 140 may output various data control signals DCS including a source start pulse SSP, a source sampling clock SSC, a source output enable signal SOE and so on.

The source start pulse SSP controls the data sampling start timing of the at least one SDIC which constitutes the data driver circuit 130. The source sampling clock SSC is a clock signal which controls a data sampling timing in each SDIC. The source output enable signal SOE may control the output timing of the data driver circuit 130.

The display device 100 may further include a power management integrated circuit (PMIC) which supplies various voltages or currents to the display panel 110, the gate driver circuit 120 and the data driver circuit 130 or controls various voltages or currents to be supplied.

Each subpixel SP may be an area which is defined by the intersection of the gate line GL and the data line DL, and liquid crystals or a light emitting element may be disposed in the subpixel SP depending on the type of the display device 100.

For example, when the display device 100 is a liquid crystal display device, the display device 100 may include a light source device such as a backlight unit 200 which radiates light to the display panel 110, and liquid crystals may be disposed in the subpixel SP of the display panel 110. By adjusting the arrangement of liquid crystals by an electric field formed as a data voltage is applied to each subpixel SP, an image may be displayed with brightness according to image data.

Figure 2:
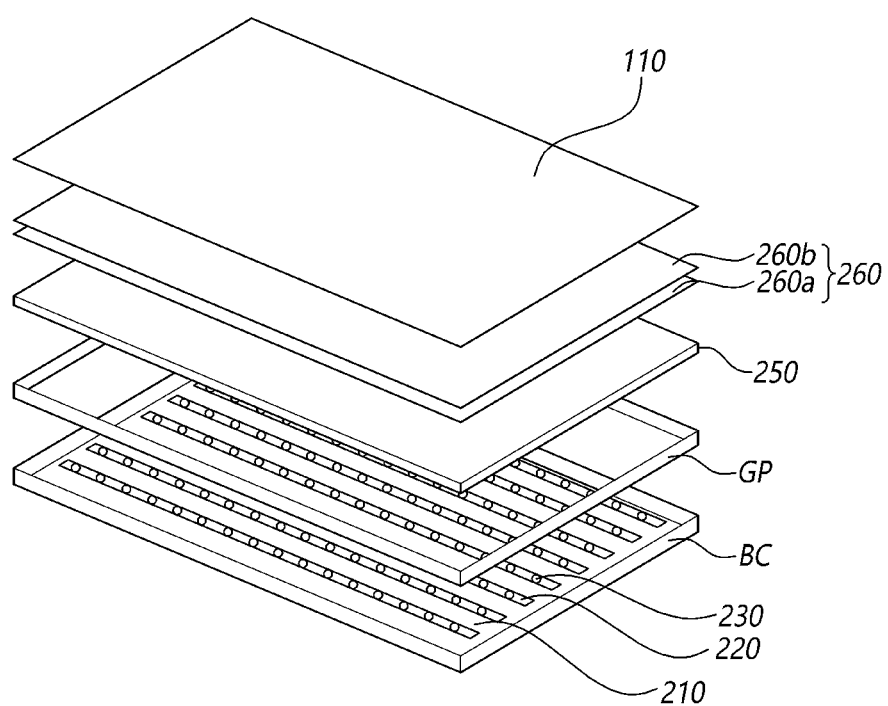
FIG. 2 is a diagram illustrating components included in a display device in accordance with embodiments of the present disclosure.

FIG. 2 is a diagram illustrating components included in a display device 100 in accordance with embodiments of the present disclosure.

Referring to FIG. 2, the display device 100 may include a display panel 110, a guide panel GP, a bottom cover BC, and a backlight unit 200.

The display panel 110 may be coupled with the backlight unit 200 by the guide panel GP.

Although not shown in FIG. 2, the display panel 110 may include a liquid crystal layer which is disposed between a first substrate and a second substrate. The first substrate and the second substrate may be made of a transparent material such as glass or plastic, and may be disposed to face each other.

The first substrate may include a plurality of gate lines, a plurality of data lines, and a plurality of subpixels. In each of the plurality of subpixels, a thin film transistor which performs a switching function, a common electrode to which a common voltage is applied, and a pixel electrode which is connected to the thin film transistor to be applied with an image signal as the thin film transistor is turned on may be disposed.

In the second substrate, a black matrix which blocks light transmission in a non-display area and a color filter layer which implements a color may be disposed.

As a scan signal is supplied to the thin film transistor through a gate line, the thin film transistor may be turned on. As an image signal is applied to the pixel electrode through a data line, an electric field may be formed between the pixel electrode and the common electrode. As the transmittance of light passing through the liquid crystal layer is adjusted by adjusting the strength of the electric field between the pixel electrode and the common electrode, an image may be realized.

As the pixel electrode and the common electrode are formed in the first substrate to form an electric field parallel to the surface of the substrate in the liquid crystal layer, the display device 100 may be driven in an in-plane switching (IPS) mode or a fringe field switching (FFS) mode. In addition, as the pixel electrode is formed in the first substrate and the common electrode is formed in the second substrate to form an electric field perpendicular to the surface of the substrate in the liquid crystal layer, the display device 100 may be driven in a twisted nematic (TN) mode or a vertical alignment (VA) mode.

Referring to FIG. 2, the bottom cover BC may be a component for supporting the display device 100.

The bottom cover BC may be made of metal or polymer resin with high thermal conductivity.

Referring to FIG. 2, the backlight unit 200 may be configured by a reflector 210 which reflects light to the display panel 110, a plurality of light source substrates 220 in which various wirings are formed to supply signals to light sources, a plurality of light sources 230 which supply light to the display panel 110, and a diffusion plate 250 and an optical sheet 260 which can improve the light efficiency of light emitted from the plurality of light sources 230 and supplied to the display panel 110.

Referring to FIG. 2, the reflector 210 may be disposed on the bottom cover BC. The reflector 210 may reflect light directed downward from the plurality of light sources 230, to the display panel 110.

Referring to FIG. 2, the plurality of light source substrates 220 may be disposed on the reflector 210. Alternatively, partial areas of the reflector 210 may be removed, and the plurality of light source substrates 220 may be disposed in the corresponding areas.

The plurality of light source substrates 220 may be disposed at regular intervals on the bottom cover BC. A plurality of light sources 230 may be mounted in a line on each of the plurality of light source substrates 220. Various signal wirings which are electrically connected to the plurality of light sources 230 may be formed in the plurality of light source substrates 220.

Referring to FIG. 2, as each of the plurality of light sources 230, a fluorescent lamp such as a light emitting diode (LED), a cold cathode fluorescent lamp (CCFL) and an external electrode fluorescent lamp (EEFL) may be used.

The plurality of light sources 230 may be mounted in a line on the light source substrate 220. The plurality of light source substrates 220 may include a first light source substrate to a kth light source substrate, and the plurality of light sources 230 may be divided into a first light source array to a kth light source array. Referring to FIG. 2, eight light source arrays may be checked.

When the plurality of light sources 230 are LEDs, R, G and B LEDs which emit monochromatic light of red (R), green (G) and blue (B) may be used, and, white (W) LEDs which emit white light may be used. When the light-emitting diode (LED) is a monochromatic LED which emits monochromatic light, the LED may be a mini-LED with a size of about 300 μm to 1000 μm or a micro-LED with a size of 100 μm or less.

Referring to FIG. 2, the diffusion plate 250 may be disposed above the plurality of light sources 230 to be spaced apart from the plurality of light sources 230. The diffusion plate 250 may diffuse light incident from the plurality of light sources 230 to prevent a lattice defect.

Referring to FIG. 2, the optical sheet 260 may improve the efficiency of light incident from the diffusion plate 250. The optical sheet 260 may include a diffusion sheet 260a and a prism sheet 260b.

The diffusion sheet 260a may rediffuse light incident from the diffusion plate 250 to uniform light emitted to the display panel 110. The diffusion sheet 260a may be composed of one sheet.

The prism sheet 260b may condense light diffused by the diffusion sheet 260a so that straight light is supplied to the display panel 110. The prism sheet 260b may be composed of two prism sheets. A first prism sheet and a second prism sheet may be disposed such that prisms perpendicularly intersect with each other in horizontal and vertical directions. The prism sheet 260b may refract light to improve straightness of light.

The guide panel GP may support the display panel 110 and the backlight unit 200.

When the bottom cover BC is coupled to the guide panel GP, the display device 100 may be completed.

Figure 3:
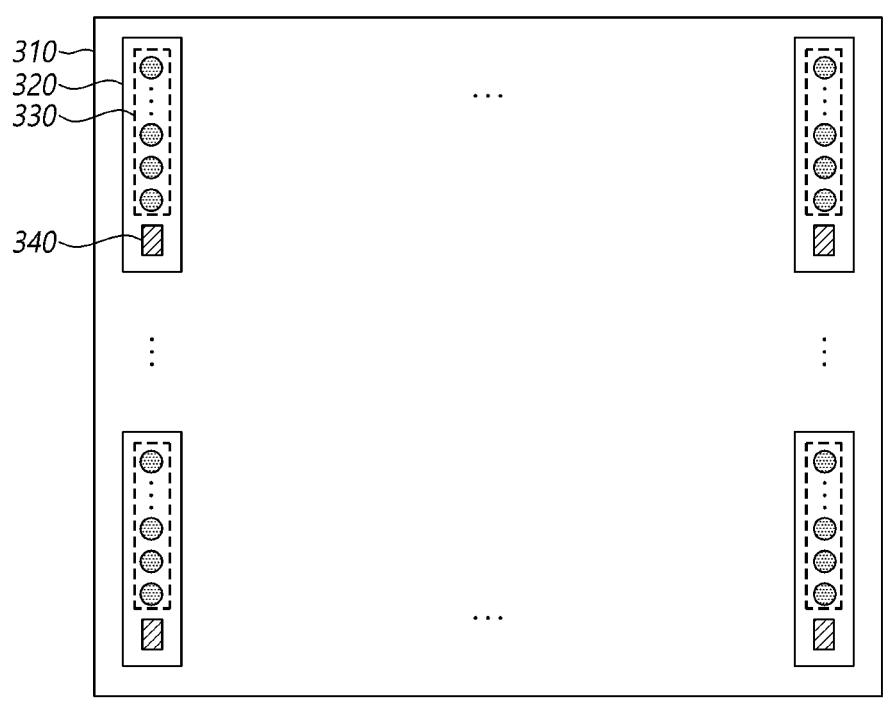
FIG. 3 is a diagram illustrating a backlight unit in accordance with embodiments of the present disclosure.

FIG. 3 is a diagram illustrating a backlight unit 300 in accordance with embodiments of the present disclosure.

Referring to FIG. 3, the backlight unit 300 may include a reflector 310, a light source substrate 320, a light source array 330, and a light source driver circuit 340.

Referring to FIG. 3, the backlight unit 300 may supply light to the display panel 110 through light source arrays 330 which are disposed on a plurality of light source substrates 320 disposed transversely and longitudinally. That is to say, the backlight unit 300 may be configured in an active-matrix form.

The backlight unit 300 may be driven in an active-matrix method.

Referring to FIG. 3, the reflector 310 may reflect light to the display panel 110. The reflector 310 may be the same as the reflector 210 shown in FIG. 2.

Referring to FIG. 3, the light source substrate 320 may be formed with various wirings to supply signals to light sources. The light source substrate 320 may be the same as the light source substrate 220 shown in FIG. 2.

One or more light source substrates 320 may be disposed on the reflector 310. The one or more light source substrates 320 may be disposed in a line up and down and be disposed in a line left and right on the reflector 310. For example, when the number of columns in up and down directions is j and the number of rows in left and right directions is i, the number of the one or more light source substrates 320 may be i*j.

Referring to FIG. 3, the light source array 330 may supply light to the display panel 110.

The light source array 330 may be disposed in a line on the light source substrate 320.

The light source array 330 may be the same as the plurality of light sources 230 shown in FIG. 2.

Referring to FIG. 3, the light source driver circuit 340 may drive the light source array 330.

The light source driver circuit 340 may be disposed and mounted on the light source substrate 320.

The light source driver circuit 340 may be configured by elements for driving the light source array 330. For example, the light source driver circuit 340 may include a plurality of transistors T and a storage capacitor Cst.

The light source driver circuit 340 may be supplied with voltages such as a driving voltage EVDD and a base voltage EVSS from a power management integrated circuit PMIC.

Figure 4:
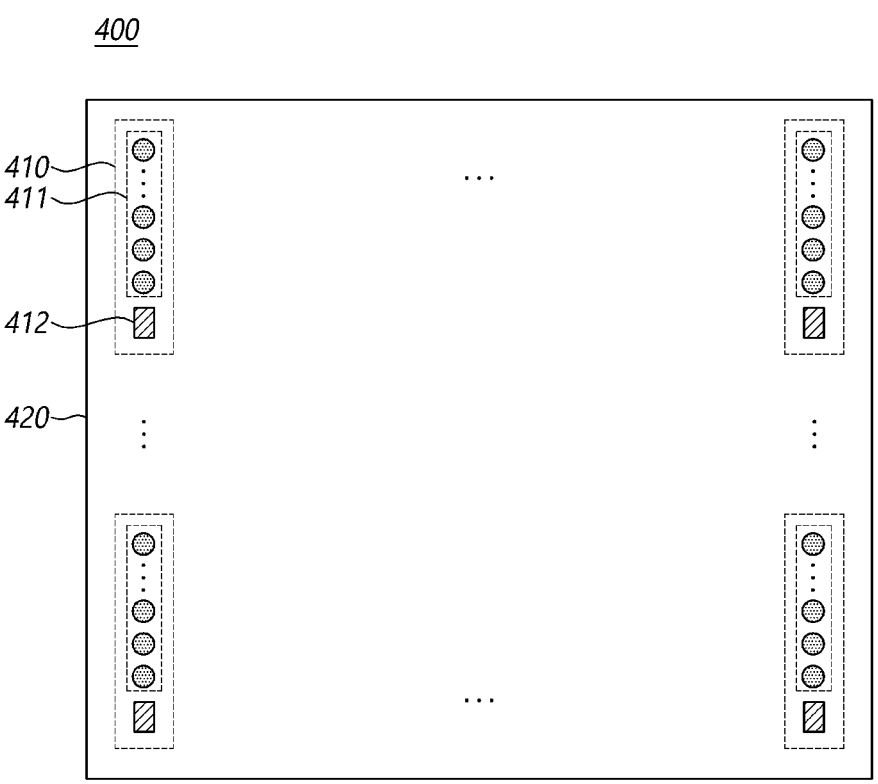
FIG. 4 is a diagram illustrating a backlight unit in accordance with embodiments of the present disclosure.

FIG. 4 is a diagram illustrating a backlight unit 400 in accordance with embodiments of the present disclosure.

Referring to FIG. 4, the backlight unit 400 may include a light source array 411, a light source driver circuit 412, and a substrate 420.

The backlight unit 400 may be driven in an active-matrix method. For example, the backlight unit 400 may include a first light emitting array circuit and a second light emitting array circuit which is different from the first light emitting array circuit. The first light emitting array circuit and the second light emitting array circuit may be driven in an active-matrix method. The second light emitting array circuit may emit light with an intensity different from that of the first light emitting array circuit.

Referring to FIG. 4, a light emitting array circuit 410 may include the light source array 411 and the light source driver circuit 412.

One or more light emitting array circuits 410 may be disposed on the substrate 420. The one or more light emitting array circuits 410 may be disposed in a line up and down and be disposed in a line left and right on the substrate 420. For example, when the number of columns in up and down directions is m and the number of rows in left and right directions is n, the number of the one or more light emitting array circuits 410 may be n*m. In other words, the backlight unit 400 may be configured in an active-matrix form.

Referring to FIG. 4, the light source array 411 may supply light to the display panel 110.

The light source array 411 may be formed on the substrate 420.

The light source array 411 may be a light emitting diode (LED).

When the light source array 411 is an LED, the light source array 411 may include a red LED, a green LED and a blue LED. Also, when the light source array 411 is an LED, the light source array 411 may be a white LED.

When the light source array 411 is a monochromatic LED which emits monochromatic light, the monochromatic LED may be a mini-LED with a size of about 300 µm to 1000 µm or a micro-LED with a size of 100 µm or less.

Referring to FIG. 4, the light source driver circuit 412 may drive the light source array 411.

The light source driver circuit 412 may be formed on the substrate 420.

The light source driver circuit 412 may include a plurality of transistors T and a storage capacitor Cst.

Referring to FIG. 4, the substrate 420 may support components which are to be formed on the substrate 420.

The substrate 420 may be made of an insulating material such as glass, quartz, or polymer resin.

Transistors and circuits may be disposed on the substrate 420 through a process of forming transistors.

Figure 5:
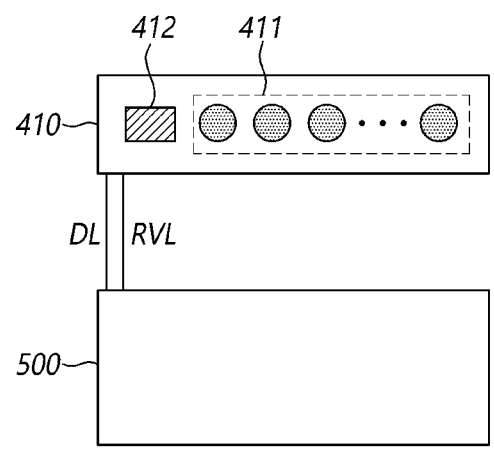
FIG. 5 is a diagram illustrating a light emitting array circuit and a data driver circuit in accordance with embodiments of the present disclosure.

FIG. 5 is a diagram illustrating a light emitting array circuit 410 and a data driver circuit 500 in accordance with embodiments of the present disclosure.

Referring to FIG. 5, the light emitting array circuit 410 may include a light source array 411 and a light source driver circuit 412. The light emitting array circuit 410 may be the same as the light emitting array circuit 410 shown in FIG. 4.

Referring to FIG. 5, the data driver circuit 500 may drive the light emitting array circuit 410.

The data driver circuit 500 may supply a voltage to the light emitting array circuit 410. The data driver circuit 500 may sense a voltage of a specific node of the light emitting array circuit 410.

The data driver circuit 500 may be electrically connected to the light emitting array circuit 410 through a data line DL and a reference voltage line RVL.

The data driver circuit 500 may supply a light emitting data voltage Vedata through the data line DL. The data driver circuit 500 may supply a reference voltage through the reference voltage line RVL.

The data driver circuit 500 may sense the voltage of a node which is electrically connected to the reference voltage line RVL.

The data driver circuit 500 may be the same as the data driver circuit 130 shown in FIG. 1.

The data driver circuit 500 may be disposed as a component separate from the data driver circuit 130 shown in FIG. 1, but the internal circuit structure of the data driver circuit 500 may be the same as the internal circuit structure of the data driver circuit 130 shown in FIG. 1.

The data driver circuit 500 may receive light emitting data from a controller 140 and convert the light emitting data into the light emitting data voltage Vedata of an analog type. The data driver circuit 500 may output the light emitting data voltage Vedata to each data line DL at a timing when a scan signal is applied through a gate line GL, to allow each light emitting array circuit 410 to represent brightness according to the light emitting data.

Different light emitting data voltages Vedata may be supplied to a plurality of light emitting array circuits 410. Accordingly, the display panel 110 may emit light of various intensities for respective areas of the display panel 110. Namely, a local dimming technique may be implemented.

For example, a backlight unit may include a first light emitting array circuit and a second light emitting array circuit which is different from the first light emitting array circuit. The first light emitting array circuit and the second light emitting array circuit may be driven in an active-matrix method. The second light emitting array circuit may emit light with an intensity different from that of the first light emitting array circuit.

The data driver circuit 500 may include at least one source driver integrated circuit (SDIC).

Each source driver integrated circuit (SDIC) may include a shift register SR, a latch circuit LATCH, a digital-to-analog converter DAC, an output buffer BUF, an analog-to-digital converter ADC, and so on.

Each source driver integrated circuit (SDIC) may be connected to bonding pads of the substrate 420 in a tape automated bonding (TAB) method or a chip-on-glass (COG) method, or may be directly disposed in the substrate 420. As the case may be, each source driver integrated circuit (SDIC) may be disposed in the substrate 420 by being integrated thereinto. Alternatively, each source driver integrated circuit (SDIC) may be implemented in a chip-on-film (COF) method. In this case, each source driver integrated circuit (SDIC) may be mounted on a film which is connected to the substrate 420, and may be electrically connected to the substrate 420 through wirings on the film. However, a location where the source driver integrated circuit (SDIC) is disposed is not limited.

Figure 6:
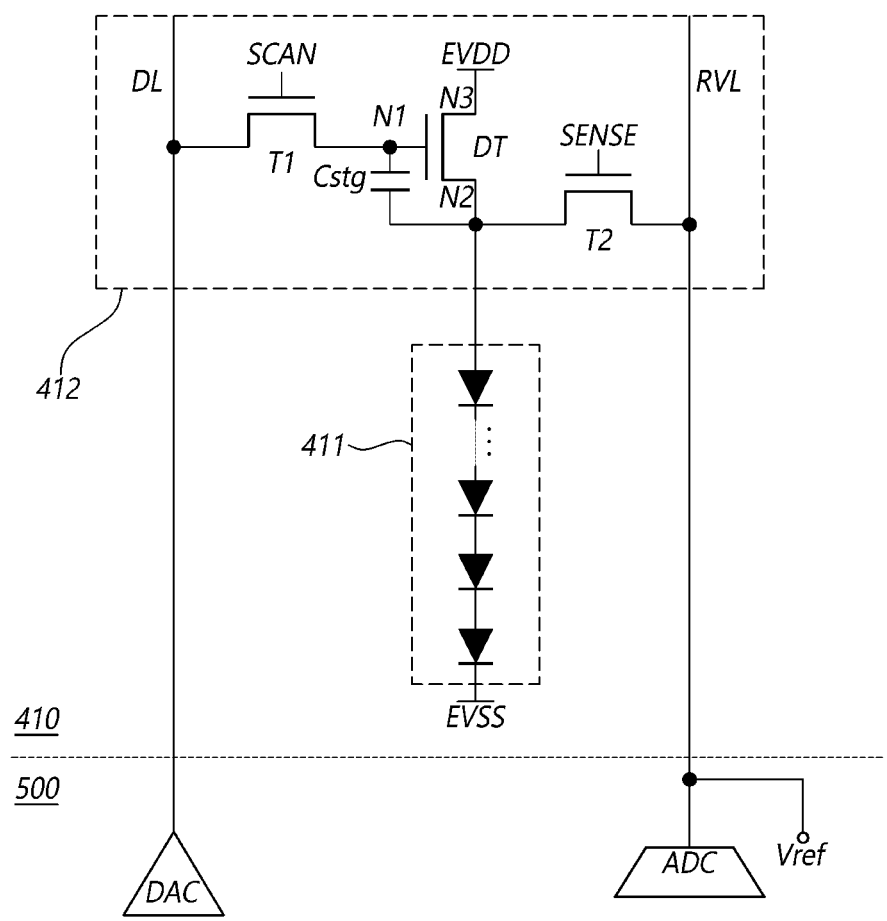
FIG. 6 is a circuit diagram illustrating the light emitting array circuit and the data driver circuit in accordance with the embodiments of the present disclosure.

FIG. 6 is a circuit diagram illustrating the light emitting array circuit 410 and the data driver circuit 500 in accordance with the embodiments of the present disclosure.

The light emitting array circuit 410 may include a light source array 411 and a light source driver circuit 412.

The light source array 411 may be electrically connected between a second node N2 and a node to which a base voltage EVSS is supplied.

The light source array 411 may be a light emitting diode (LED).

When the light source array 411 is an LED, the light source array 411 may include a red LED, a green LED and a blue LED. Also, when the light source array 411 is an LED, the light source array 411 may be a white LED.

When the light source array 411 is a monochromatic LED which emits monochromatic light, the monochromatic LED may be a mini-LED with a size of about 300 µm to 1000 µm or a micro-LED with a size of 100 µm or less.

The light source driver circuit 412 may drive the light source array 411.

The light source driver circuit 412 may include a driving transistor DT, a scan transistor T1, a sensing transistor T2 and a storage capacitor Cstg.

The driving transistor DT as a transistor for driving the light source array 411 may include a first node N1, the second node N2 and a third node N3.

The first node N1 of the driving transistor DT may be a gate node of the driving transistor DT, and may be electrically connected to a source node or a drain node of the scan transistor T1. The second node N2 of the driving transistor DT may be a source node or a drain node of the driving transistor DT, may be electrically connected to a source node or a drain node of the sensing transistor T2, and may also be electrically connected to the light source array 411. The third node N3 of the driving transistor DT may be electrically connected to a driving voltage line DVL which supplies a driving voltage EVDD.

The scan transistor T1 may be controlled by a scan signal SCAN, and may be connected between the first node N1 of the driving transistor DT and a data line DL. The scan transistor T1 may be turned on or off according to the scan signal SCAN supplied from a scan signal line SCL which is one kind of gate line GL, thereby controlling connection between the data line DL and the first node N1 of the driving transistor DT.

The sensing transistor T2 may be controlled by a sense signal SENSE, and may be connected between the second node N2 of the driving transistor DT and a reference voltage line RVL. The sensing transistor T2 may be turned on or off according to the sense signal SENSE supplied from a sense signal line SENL which is another kind of gate line GL, thereby controlling connection between the reference voltage line RVL and the second node N2 of the driving transistor DT. When the sensing transistor T2 is switched to a turn-on state, a reference voltage Vref may be supplied to the second node N2 through the sensing transistor T2.

The storage capacitor Cstg may be connected between the first node N1 and the second node N2 of the driving transistor DT. The storage capacitor Cstg is charged with an amount of charge corresponding to a voltage difference between both ends, and serves to maintain the voltage difference between both ends for a predetermined time. Accordingly, the light source array 411 may emit light for the predetermined time.

The data driver circuit 500 may drive the light emitting array circuit 410.

The data driver circuit 500 may include a shift register SR, a latch circuit LATCH, a digital-to-analog converter DAC, an output buffer BUF, an analog-to-digital converter ADC, and so on.

The data driver circuit 500 may be electrically connected to the light emitting array circuit 410.

The digital-to-analog converter DAC of the data driver circuit 500 may be electrically connected to the data line DL. Since the data line DL may be electrically connected to the scan transistor T1, the digital-to-analog converter DAC may be electrically connected to the scan transistor T1.

The analog-to-digital converter ADC of the data driver circuit 500 may be electrically connected to the reference voltage line RVL. Since the reference voltage line RVL may be electrically connected to the sensing transistor T2, the analog-to-digital converter ADC may be electrically connected to the sensing transistor T2.

As the sensing transistor T2 is switched to a turn-on state, the voltage of the second node N2 of the driving transistor DT may be supplied to the reference voltage line RVL. Referring to FIG. 6, the supply of the voltage of the second node N2 to the reference voltage line RVL may be referred to as "sensing," and the display device 100 may obtain a sensing value as the voltage of the second node N2 through sensing.

The light source array 411 may include a defective light source in which a defect has occurred due to a short or the like. The voltage of the second node N2 when a defective light source does not exist in the light source array 411 may be different from the voltage of the second node N2 when a defective light source exists in the light source array 411. Therefore, by obtaining the voltage of the second node N2 as a sensing value through the above-described sensing, it is possible to determine whether a defective light source is included in the light source array 411.

However, it is only possible to determine whether a defective light source is included in the light source array 411, and which light source in the light source array 411 is a defective light source is not determined. Therefore, when it is determined that a defective light source is included in the light source array 411, the entire light source array 411 should be replaced. Namely, since not only a defective light source is replaced but also normal light sources need to be replaced as well, there is a problem in that the normal light sources are replaced before their lifespan ends.

Embodiments of the present disclosure may provide a backlight unit 700, a display device 100 and a driving method thereof capable of specifying and detecting a defective light source in the light source array 411.

Embodiments of the present disclosure may provide a backlight unit 700, a display device 100 and a driving method thereof capable of recycling the light source array 411 including a defective light source.

Figure 7:
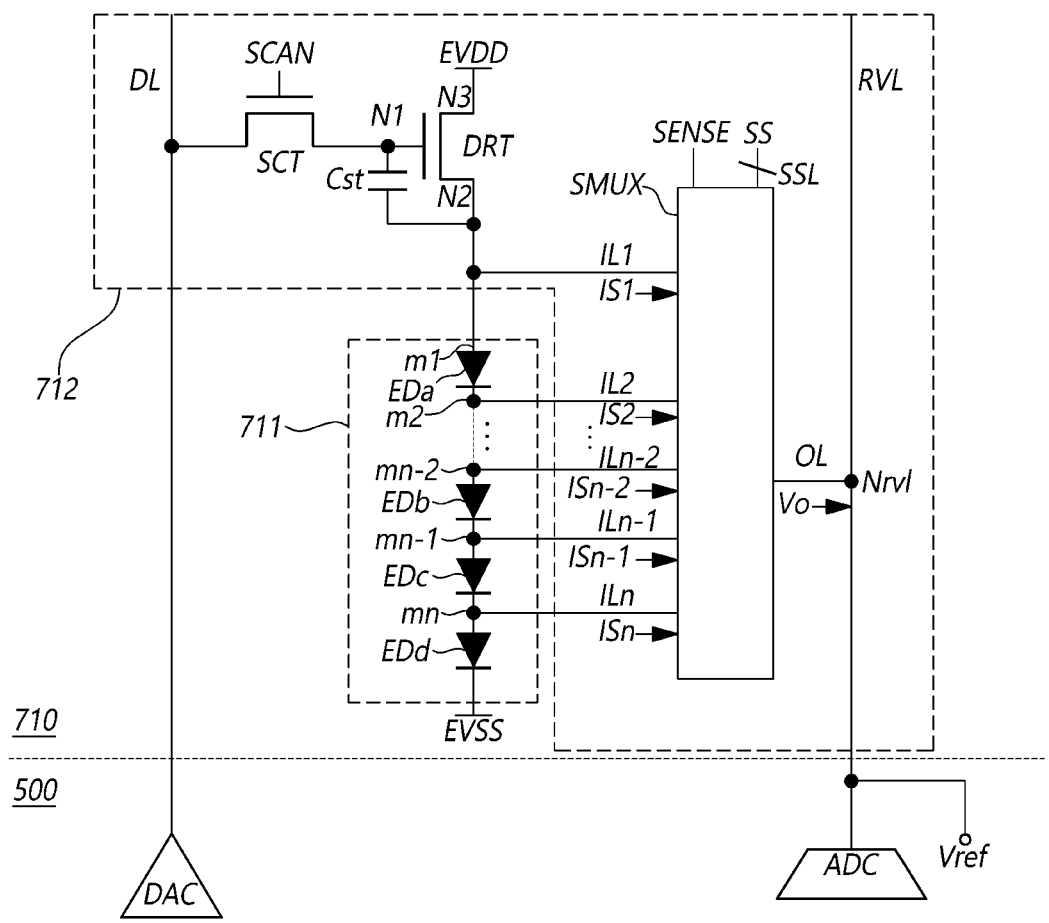
FIG. 7 is a circuit diagram illustrating a light emitting array circuit and a data driver circuit in accordance with embodiments of the present disclosure.

FIG. 7 is a circuit diagram illustrating a light emitting array circuit 710 and a data driver circuit 500 in accordance with embodiments of the present disclosure.

The display device 100 may include a backlight unit 700 and the data driver circuit 500. The backlight unit 700 may include a plurality of light emitting array circuits 710. The backlight unit 700 may be the same as the backlight unit 400 shown in FIG. 4.

Referring to FIG. 7, the light emitting array circuit 710 may be included in the backlight unit 700.

The light emitting array circuit 710 may include a light source array 711 and a light source driver circuit 712.

The light source array 711 may include a plurality of light sources ED. An nth light source ED may be electrically connected between an nth light emitting node and an (n+1)th light emitting node.

Referring to FIG. 7, the light source array 711 may include an ath light source EDa, a bth light source EDb, a cth light source EDc and a dth light source EDd.

The ath light source EDa may be electrically connected between an m1st light emitting node m1 and an m2nd light emitting node m2. The m1st light emitting node m1 may be the same node as a second node N2.

The bth light source EDb may be electrically connected between an (mn−2)th light emitting node mn−2 and an (mn−1)th light emitting node mn−1.

The cth light source EDc may be electrically connected between the (mn−1)th light emitting node mn−1 and an mnth light emitting node mn.

The dth light source EDd may be electrically connected between the mnth light emitting node mn and a node to which a base voltage EVSS is supplied.

The light source array 711 may be electrically connected between the second node N2 and the base voltage node to which the base voltage EVSS is supplied.

The light source array 711 may be a light emitting diode (LED).

When the light source array 711 is an LED, the light source array 711 may include a red LED, a green LED and a blue LED. Also, when the light source array 711 is an LED, the light source array 711 may be a white LED.

When the light source array 711 is a monochromatic LED which emits monochromatic light, the monochromatic LED may be a mini-LED with a size of about 300 μm to 1000 μm or a micro-LED with a size of 100 μm or less.

The light source driver circuit 712 may drive the light source array 711.

The light source driver circuit 712 for driving the light source array 711 may include a driving transistor DRT, a scan transistor SCT, a sensing MUX circuit SMUX, and a storage capacitor Cst.

The driving transistor DRT as a transistor for driving the light source array 711 may include a first node N1, the second node N2 and a third node N3.

The driving transistor DRT may be electrically connected between the light source array 711 and a driving voltage node to which a driving voltage EVDD is supplied.

The first node N1 of the driving transistor DRT may be a gate node of the driving transistor DRT, and may be electrically connected to a source node or a drain node of the scan transistor SCT. The second node N2 of the driving transistor DRT may be a source node or a drain node of the driving transistor DRT, may be electrically connected to the sensing MUX circuit SMUX, and may also be electrically connected to the light source array 711. The third node N3 of the driving transistor DRT may be electrically connected to a driving voltage line DVL which supplies the driving voltage EVDD.

The scan transistor SCT may be controlled by a scan signal SCAN, and may be connected between the first node N1 of the driving transistor DRT and a data line DL. The scan transistor SCT may be turned on or off according to the scan signal SCAN supplied from a scan signal line SCL which is one kind of gate line GL, thereby controlling connection between the data line DL and the first node N1 of the driving transistor DRT.

The storage capacitor Cst may be connected between the first node N1 and the second node N2 of the driving transistor DRT. The storage capacitor Cst is charged with an amount of charge corresponding to a voltage difference between both ends, and serves to maintain the voltage difference between both ends for a predetermined time. Accordingly, the light source array 711 may emit light for the predetermined time.

The sensing MUX circuit SMUX may be supplied with a sense signal SENSE, a plurality of select signals SS and a plurality of input signals IS. The sensing MUX circuit SMUX may output an output signal Vo to a reference voltage node Nrv1 on the basis of the plurality of select signals SS and the plurality of input signals IS.

The sensing MUX circuit SMUX may include a plurality of select signal lines SSL, an output line OL, and a first input line IL1 to an nth input line ILn.

The sensing MUX circuit SMUX may be supplied with the plurality of select signals SS through the plurality of select signal lines SSL.

The sensing MUX circuit SMUX may be electrically connected to the plurality of light emitting nodes m.

The sensing MUX circuit SMUX may be electrically connected to the m1st light emitting node m1 through the first input line IL1. The sensing MUX circuit SMUX may be supplied with a first input signal IS1 through the first input line IL1.

The sensing MUX circuit SMUX may be electrically connected to the m2nd light emitting node m2 through the second input line IL2. The sensing MUX circuit SMUX may be supplied with a second input signal IS2 through the second input line IL2.

The sensing MUX circuit SMUX may be electrically connected to the (mn−2)th light emitting node mn−2 through the (n−2)th input line ILn-2. The sensing MUX circuit SMUX may be supplied with an (n−2)th input signal ISn-2 through the (n−2)th input line ILn-2.

The sensing MUX circuit SMUX may be electrically connected to the (mn−1)th light emitting node mn−1 through the (n−1)th input line ILn-1. The sensing MUX circuit SMUX may be supplied with an (n−1)th input signal ISn-1 through the (n−1)th input line ILn-1.

The sensing MUX circuit SMUX may be electrically connected to the mnth light emitting node mn through the nth input line ILn. The sensing MUX circuit SMUX may be supplied with an nth input signal ISn through the nth input line ILn.

The sensing MUX circuit SMUX may be electrically connected to the reference voltage node Nrv1 through the output line OL.

The sensing MUX circuit SMUX may have a circuit structure of a multiplexer. The sensing MUX circuit SMUX may select a specific input line IL according to which select signal SS among the plurality of select signals SS is supplied. When a specific input line IL is selected, the sensing MUX circuit SMUX may be supplied with the voltage of a node which is electrically connected to the specific input line IL. After being supplied with the voltage, the sensing MUX circuit SMUX may supply the corresponding voltage to the reference voltage node Nrv1 as the output signal Vo.

The sensing MUX circuit SMUX may be supplied with the sense signal SENSE. The sensing MUX circuit SMUX may be controlled by the sense signal SENSE. The sensing MUX circuit SMUX may control connection between the second node N2 of the driving transistor DRT and a reference voltage line RVL.

The sensing MUX circuit SMUX may include a sensing transistor (not shown). In this case, the sensing transistor (not shown) of the sensing MUX circuit SMUX may be turned on or off according to the sense signal SENSE supplied from a sense signal line SENL which is another kind of gate line GL, thereby controlling connection between the reference voltage line RVL and the second node N2 of the driving transistor DRT.

When the sensing MUX circuit SMUX electrically connects the second node N2 of the driving transistor DRT and the reference voltage line RVL, a reference voltage Vref may be supplied to the second node N2 through the sensing MUX circuit SMUX. Also, when the sensing MUX circuit SMUX electrically connects the second node N2 of the driving transistor DRT and the reference voltage line RVL, the voltage of the second node N2 may be sensed through the sensing MUX circuit SMUX. Referring to FIG. 7, although one reference voltage line RVL is illustrated, two or more reference voltage lines RVL may be provided. For example, when two reference voltage lines RVL are connected to one sensing MUX circuit SMUX, whether or not a light source ED is defective may be determined on the basis of sensing voltages sensed through the two reference voltage lines RVL.

The data driver circuit 500 may drive the light emitting array circuit 710.

The data driver circuit 500 may include a shift register SR, a latch circuit LATCH, a digital-to-analog converter DAC, an output buffer BUF, an analog-to-digital converter ADC, and so on.

The data driver circuit 500 may be electrically connected to the light emitting array circuit 710.

The digital-to-analog converter DAC of the data driver circuit 500 may be electrically connected to the data line DL. Since the data line DL may be electrically connected to the scan transistor SCT, the digital-to-analog converter DAC may be electrically connected to the scan transistor SCT. That is to say, the digital-to-analog converter DAC may supply the light emitting data voltage Vedata to the light emitting array circuit 710 through the data line DL.

The analog-to-digital converter ADC of the data driver circuit 500 may be electrically connected to the reference voltage line RVL. Since the reference voltage line RVL may be electrically connected to the sensing MUX circuit SMUX, the analog-to-digital converter ADC may be electrically connected to the sensing MUX circuit SMUX. In other words, the analog-to-digital converter ADC may be electrically connected to the sensing MUX circuit MUX through the reference voltage line RVL.

A defective light source included in the light source array 711 may be detected through the backlight unit 700 including the aforementioned sensing MUX circuit SMUX and the data driver circuit 500. A method of detecting a defective light source included in the light source array 711 is not limited, but one embodiment will be described below.

The light source array 711 may include a defective light source in which a defect has occurred due to a short or the like.

When a defective light source is not included in the light source array 711, a voltage across each of the plurality of light sources ED included in the light source array 711 may have a predetermined voltage value. For example, when the light source ED is an LED, the predetermined voltage value may be the threshold voltage value of a corresponding light source ED.

However, when a defective light source is included in the light source array 711, a voltage across the defective light source may have a voltage value different from a voltage across a normal light source. For example, in the case of a defective light source in which a defect has occurred due to a short circuit, voltages of both ends of the defective light source may be the same. If the ath light source EDa is a defective light source, the voltage of the m1st light emitting node m1 and the voltage of the m2nd light emitting node m2 may have voltage values of the same magnitude. After the voltage of the m1st light emitting node m1 and the voltage of the m2nd light emitting node m2 are detected through the sensing MUX circuit SMUX, when the voltage of the m1st light emitting node m1 and the voltage of the m2nd light emitting node m2 are the same, it may be determined that the ath light source EDa is a defective light source.

Namely, according to the embodiments of the present disclosure, it is possible to provide the backlight unit 700, the display device 100 and the driving method thereof capable of specifying and detecting a defective light source in the light source array 711.

According to the embodiments of the present disclosure, it is possible to provide the backlight unit 700, the display device 100 and the driving method thereof capable of recycling the light source array 711 including a defective light source.

Figure 8:
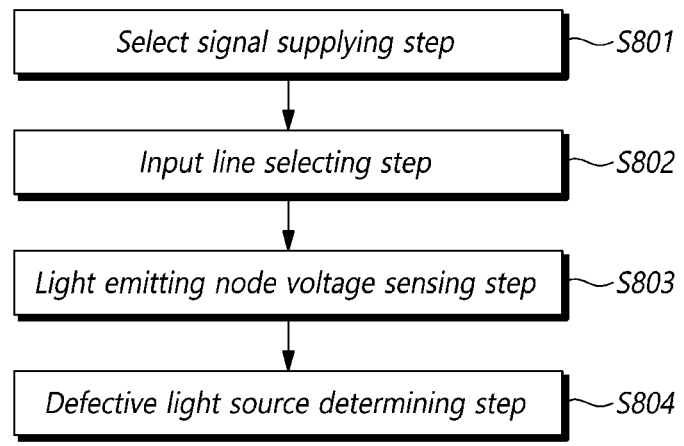
FIG. 8 is a flowchart showing a method for driving a display device in accordance with embodiments of the present disclosure.

FIG. 8 is a flowchart showing a method for driving a display device 100 in accordance with embodiments of the present disclosure.

The method for driving the display device 100 may include select signal supplying step S801, input line selecting step S802, light emitting node voltage sensing step S803, and defective light source determining step S804.

The select signal supplying step S801 may be step in which the select signals SS are supplied to the sensing MUX circuit SMUX which are electrically connected to the first light emitting node m1 and the second light emitting node m2.

The input line selecting step S802 may be step in which specific input lines IL are selected among the plurality of input lines IL included in the sensing MUX circuit SMUX according to the select signals SS. The sensing MUX circuit SMUX may select a specific input line IL according to which select signal SS among the plurality of select signals SS is supplied.

The light emitting node voltage sensing step S803 may be step in which the sensing MUX circuit SMUX senses the voltage of the light emitting node m through the input line IL. When a specific input line IL is selected, the sensing MUX circuit SMUX may be supplied with the voltage of a node which is electrically connected to the specific input line IL. After being supplied with the voltage of the corresponding node, the sensing MUX circuit SMUX may supply the corresponding voltage to the reference voltage node Nrv1 as the output signal Vo. That is to say, the voltage of a specific light emitting node m may be sensed through the sensing MUX circuit SMUX.

The defective light source determining step S804 may be step in which whether a specific light source ED is defective is determined on the basis of the voltage of the light emitting node m. The defective light source determining step S804 may be step in which whether the first light source EDa connected between the light emitting node m1 and the second light emitting node m2 included in the light source array 711 is a defective light source is determined on the basis of the voltage of the first light emitting node m1 and the voltage of the second light emitting node m2 sensed in the light emitting node voltage sensing step S803.

The voltage value of a specific light emitting node m sensed in the defective light source determining step S804 may be converted into the voltage data of the specific light emitting node m as digital data through the analog-to-digital converter ADC. The voltage data of the specific light emitting node m may be supplied to the controller 140, and thereafter, the controller 140 may determine whether the specific light source ED corresponds to a defective light source, on the basis of the voltage data of the specific light emitting node m.

Figure 9:
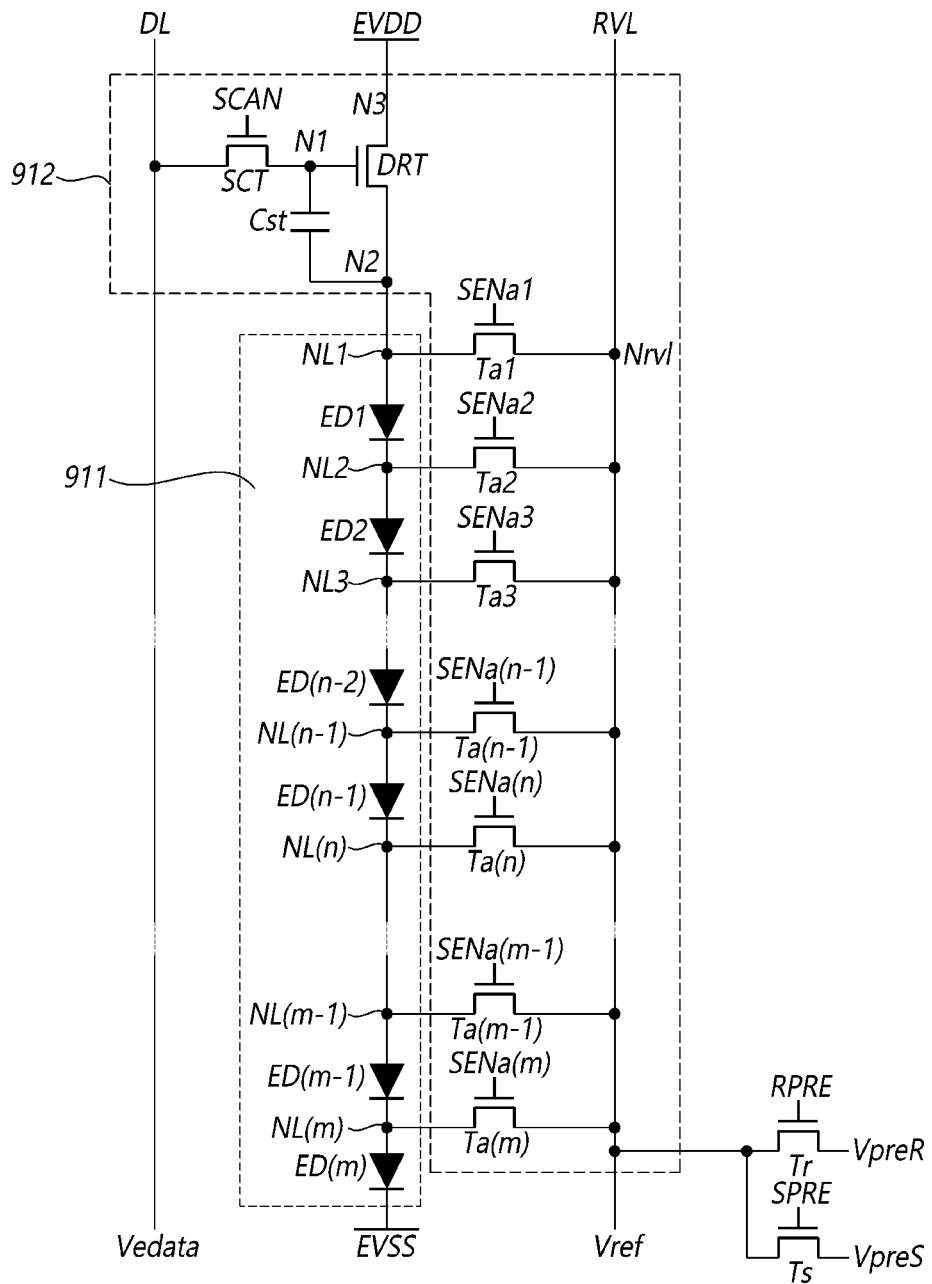
FIG. 9 is a circuit diagram illustrating a light emitting array circuit in accordance with a first embodiment of the present disclosure.
Figure 14:
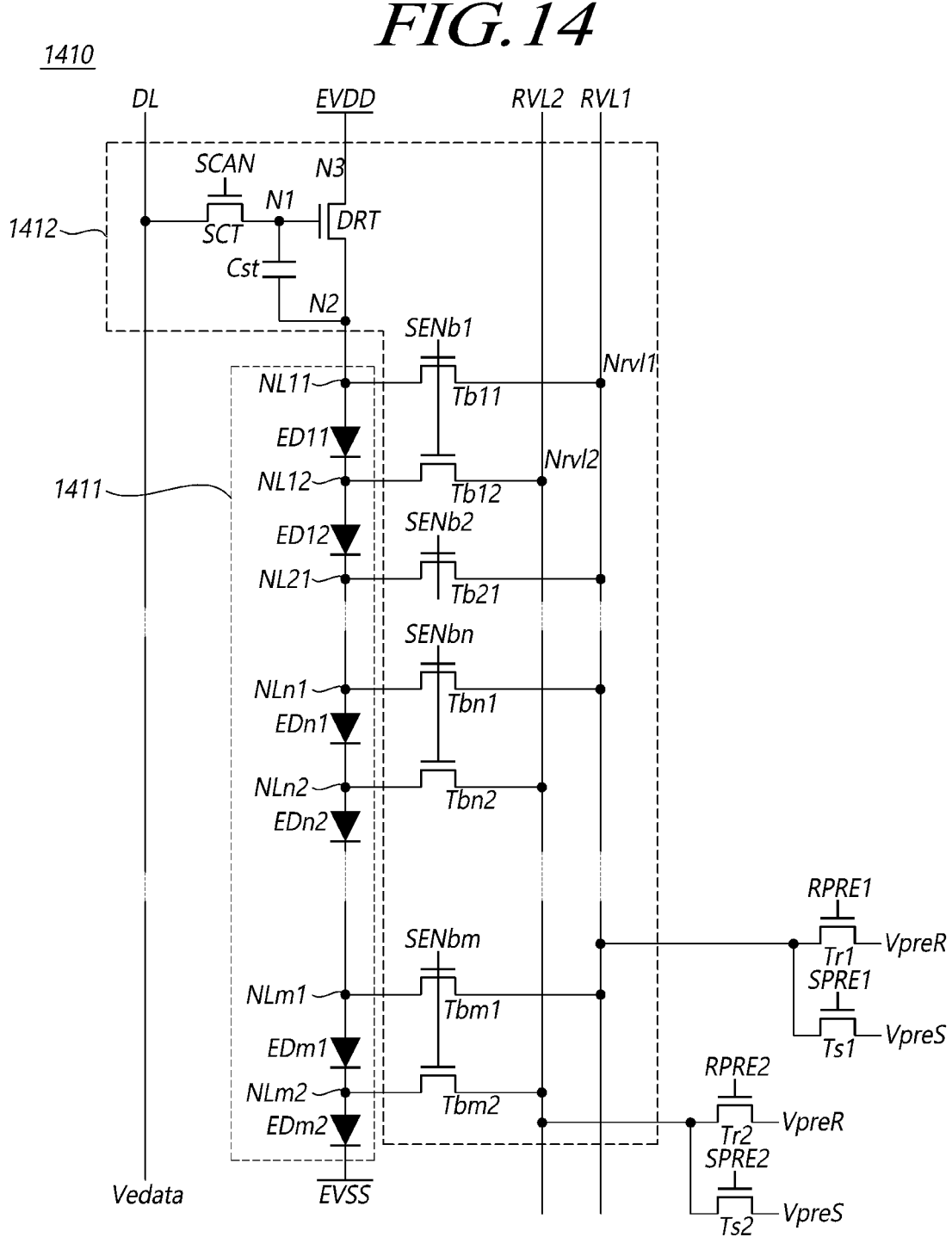
FIG. 14 is a circuit diagram illustrating a light emitting array circuit in accordance with a second embodiment of the present disclosure.
Figure 19:
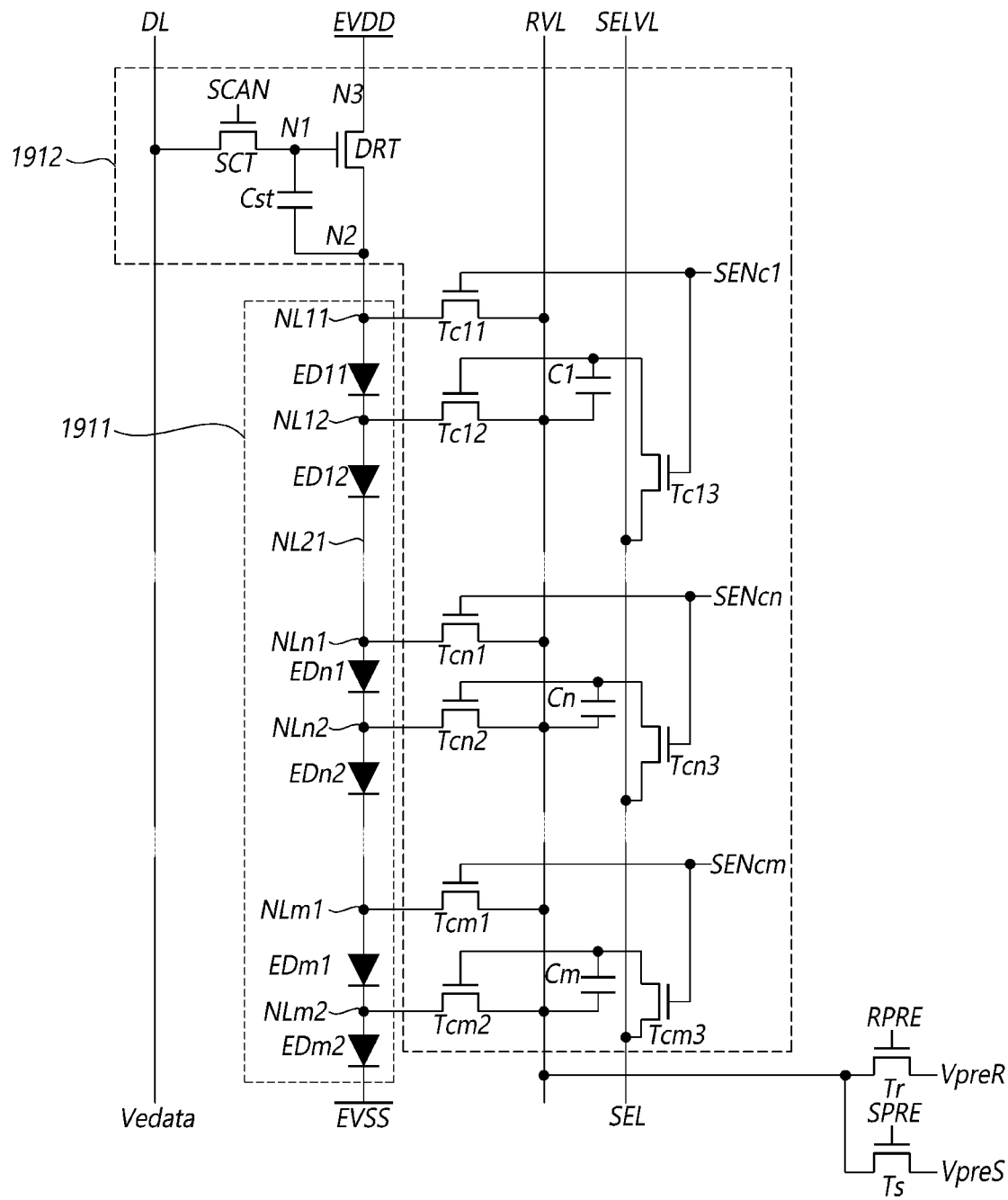
FIG. 19 is a circuit diagram illustrating a light emitting array circuit in accordance with a third embodiment of the present disclosure.

The sensing MUX circuit SMUX shown in FIG. 7 may include elements such as a plurality of sensing transistors. The voltage of a light emitting node may be sensed through control of the plurality of sensing transistors. The voltage of a light emitting node may vary depending on whether a light source is defective. In other words, it is possible to determine whether a light source is defective, on the basis of the voltage of a light emitting node. The sensing MUX circuit SMUX including a plurality of sensing transistors may be designed in various ways. Referring to FIGS. 9, 14 and 19, circuit diagrams in which a plurality of sensing transistors included in a sensing MUX circuit SMUX are shown may be seen. Hereinafter, a first embodiment will be described with reference to FIG. 9, a second embodiment will be described with reference to FIG. 14, and a third embodiment will be described with reference to FIG. 19.

FIG. 9 is a circuit diagram illustrating a light emitting array circuit 910 and a data driver circuit 500 in accordance with embodiments of the present disclosure. FIGS. 10 to 13 are diagrams for explaining a control method for the light emitting array circuit 910 in accordance with the embodiments of the present disclosure.

Referring to FIG. 9, the light emitting array circuit 910 may include a light source array 911 and a light source driver circuit 912.

The light source array 911 may include a plurality of light sources ED. Referring to FIG. 9, the number of the plurality of light sources ED may be m, and the plurality of light sources ED may include a first light source ED1, a second light source ED2, an (n−2)th light source ED(n−2), an (n−1)th light source ED(n−1), an (m−1)th light source ED(m−1), and an mth light source ED(m).

The plurality of light sources ED may be electrically connected between light emitting nodes NL. For example, a first light source may be electrically connected between a first light emitting node and a second light emitting node, and a second light source may be electrically connected between the second light emitting node and a third light emitting node.

Referring to FIG. 9, the first light source ED1 may be electrically connected between a first light emitting node NL1 and a second light emitting node NL2. The first light emitting node NL1 may be a second node N2.

Referring to FIG. 9, the second light source ED2 may be electrically connected between the second light emitting node NL2 and a third light emitting node NL3.

Referring to FIG. 9, the (n−2)th light source ED(n−2) may be electrically connected between an (n−2)th light emitting node NL(n−2) and an (n−1)th light emitting node NL(n−1).

Referring to FIG. 9, the (n−1)th light source ED(n−1) may be electrically connected between the (n−1)th light emitting node NL(n−1) and an nth light emitting node NL(n).

Referring to FIG. 9, the (m−1)th light source ED(m−1) may be electrically connected between an (m−1)th light emitting node NL(m−1) and an mth light emitting node NL(m).

Referring to FIG. 9, the mth light source ED(m) may be electrically connected between the mth light emitting node NL(m) and an (m+1)th light emitting node NL(m+1). The (m+1)th light emitting node NL(m+1) may be a node to which a base voltage EVSS is supplied.

The light source driver circuit 912 may include a driving transistor DRT, a scan transistor SCT, a storage capacitor Cst, and a plurality of sensing transistors Ta.

The driving transistor DRT may be electrically connected between the second node N2 and a third node N3. The third node N3 may be a node to which a driving voltage EVDD is supplied. A gate node of the driving transistor DRT may be electrically connected to a first node N1.

The scan transistor SCT may be electrically connected between a data line DL and the first node N1. A light emitting data voltage Vedata may be supplied to the data line DL. A scan signal SCAN may be supplied to a gate node of the scan transistor SCT.

The storage capacitor Cst may be electrically connected between the first node N1 and the second node N2.

The driving transistor DRT, the scan transistor SCT and storage capacitor Cst shown in FIG. 9 may be the same as the driving transistor DRT, the scan transistor SCT and the storage capacitor Cst shown in FIG. 7.

The number of the plurality of sensing transistors Ta may be m. Referring to FIG. 9, the plurality of sensing transistors Ta may include a first sensing transistor Ta1, a second sensing transistor Ta2, a third sensing transistor Ta3, an (n−1)th sensing transistor Ta(n−1), an nth sensing transistor Ta(n), an (m−1)th sensing transistor Ta(m−1), and an mth sensing transistor Ta(m).

The plurality of sensing transistors Ta may be electrically connected between the light emitting nodes NL and a reference voltage line RVL.

Referring to FIG. 9, the first sensing transistor Ta1 may be electrically connected between the first light emitting node NL1 and the reference voltage line RVL. A first sense signal SENa1 may be supplied to a gate node of the first sensing transistor Ta1.

Referring to FIG. 9, the second sensing transistor Ta2 may be electrically connected between the second light emitting node NL2 and the reference voltage line RVL. A second sense signal SENa2 may be supplied to a gate node of the second sensing transistor Ta2.

Referring to FIG. 9, the third sensing transistor Ta3 may be electrically connected between the third light emitting node NL3 and the reference voltage line RVL. A third sense signal SENa3 may be supplied to a gate node of the third sensing transistor Ta3.

Referring to FIG. 9, the (n−1)th sensing transistor Ta(n−1) may be electrically connected between the (n−1)th light emitting node NL(n−1) and the reference voltage line RVL. An (n−1)th sense signal SENa(n−1) may be supplied to a gate node of the (n−1)th sensing transistor Ta(n−1).

Referring to FIG. 9, the nth sensing transistor Ta(n) may be electrically connected between the nth light emitting node NL(n) and the reference voltage line RVL. An nth sense signal SENa(n) may be supplied to a gate node of the nth sensing transistor Ta(n).

Referring to FIG. 9, the (m−1)th sensing transistor Ta(m−1) may be electrically connected between the (m−1)th light emitting node NL(m−1) and the reference voltage line RVL. An (m−1)th sense signal SENa(m−1) may be supplied to a gate node of the (m−1)th sensing transistor Ta(m−1).

Referring to FIG. 9, the mth sensing transistor Ta(m) may be electrically connected between the mth light emitting node NLm and the reference voltage line RVL. An mth sensing signal SENa(m) may be supplied to a gate node of the mth sensing transistor Ta(m).

The data driver circuit 500 may include a driving reference voltage transistor Tr and a sensing reference voltage transistor Ts.

The driving reference voltage transistor Tr may be controlled by a driving control signal RPRE. Depending on whether the driving reference voltage transistor Tr is controlled, a driving reference voltage VpreR may be supplied to the reference voltage line RVL. "VpreR" described in the present specification may be described as "V PRER" in a drawing.

The sensing reference voltage transistor Ts may be controlled by a sensing control signal SPRE. Depending on whether the sensing reference voltage transistor Ts is controlled, a sensing reference voltage VpreS may be supplied to the reference voltage line RVL. "VpreS" described in the present specification may be described as "V PRES" in a drawing.

Whether a light source ED is defective may be determined according to control of the plurality of sensing transistors Ta and signals. The voltage of a light emitting node NL is sensed through the reference voltage line RVL, and on the basis of the sensed voltage, whether a light source ED is defective may be determined. A sensed voltage may vary depending on whether a light source ED is defective or not. A voltage when a light source ED is normal may be checked through a test. If a sensed voltage is different from a voltage when a light source ED is normal, a light source ED may be determined as a defective light source.

The plurality of sensing transistors Ta and signals may be controlled in various ways. Referring to FIGS. 10 to 13, examples in which the plurality of sensing transistors Ta and signals are controlled may be seen.

Figure 10:
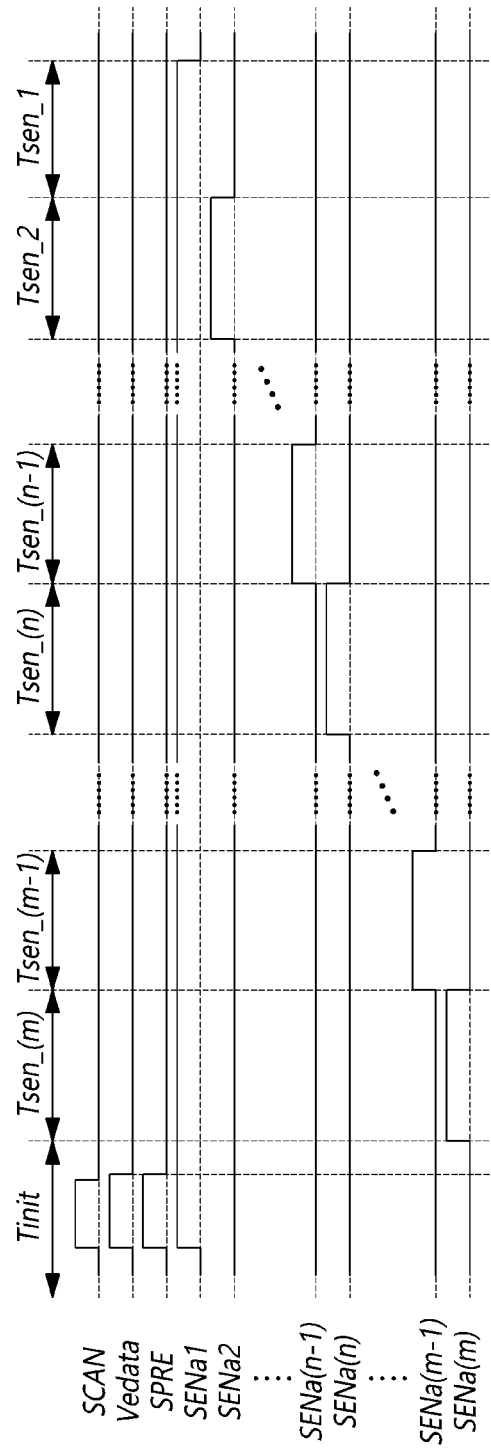
FIGS. 10 to 13 are diagrams for explaining a control method for the light emitting array circuit in accordance with the first embodiment of the present disclosure.

Referring to FIG. 10, a defective light source detection period may include an initialization period Tinit and a plurality of sensing periods Tsen.

The initialization period Tinit may be a period for initializing the voltage state of the light emitting array circuit 910.

During the initialization period Tinit, the scan signal SCAN for turning on the scan transistor SCT may be supplied to the gate node of the scan transistor SCT.

During the initialization period Tinit, the light emitting data voltage Vedata for driving the driving transistor DRT may be supplied to the data line DL.

During the initialization period Tinit, the sensing control signal SPRE for turning on the sensing reference voltage transistor Ts may be supplied to a gate node of the sensing reference voltage transistor Ts.

During the initialization period Tinit, the first sense signal SENa1 for turning on the first sensing transistor Ta1 may be supplied to the first sensing transistor Ta1. During the initialization period Tinit, the remaining sense signals SENa other than the first sense signal SENa1 may have a level opposite to that of the first sense signal SENa1. For example, when the first sense signal SENa1 is a high-level signal, the remaining sense signals SENa may be low-level signals.

After the initialization period Tinit, the plurality of sensing periods Tsen may proceed.

The plurality of sensing periods Tsen may be periods for sensing voltages of the plurality of light emitting nodes NL.

Through sensing voltages of two sensing periods Tsen included in the plurality of sensing periods Tsen, whether two light sources ED are defective or not may be determined. Referring to FIG. 10, the plurality of sensing periods Tsen may proceed from an mth sensing period Tsen_(m) to a first sensing period Tsen_1.

The first sense signal SENa1 may be a high-level signal during the initialization period Tinit and the plurality of sensing periods Tsen. A sensing transistor Ta which is supplied with a sense signal SENa as a high-level signal may be turned on.

The mth sense signal SENa(m) may be a high-level signal during the mth sensing period Tsen_(m). The (m−1)th sense signal SENa(m−1) may be a high-level signal during the (m−1)th sensing period Tsen_(m−1). The nth sense signal SENa(n) may be a high-level signal during the nth sensing period Tsen_(n). The (n−1)th sense signal SENa(n−1) may be a high-level signal during the (n−1)th sensing period Tsen_(n−1). The second sense signal SENa2 may be a high-level signal during the second sensing period Tsen_2. Namely, the mth sense signal SENa(m) to the second sense signal SENa2 may be high-level signals during the mth sensing period Tsen_(m) to the second sensing period Tsen_2 corresponding to the mth sense signal SENa(m) to the second sense signal SENa2, respectively.

Referring to FIG. 10, it has been described for the sake of convenience in explanation that the mth sensing period Tsen_(m) to the first sensing period Tsen_1 proceed sequentially, but sensing periods may proceed non-sequentially. For example, the mth sensing period Tsen_(m) may not proceed first, but the nth sensing period Tsen_(n) may proceed first. In this case, after the nth sensing period Tsen_(n) proceeds first, the (n−1)th sensing period Tsen_(n−1) may proceed.

Signals during the initialization period Tinit and the plurality of sensing periods Tsen have been described with reference to FIG. 10, and hereinafter, sensing voltages of the light emitting nodes NL will be described with reference to FIG. 11.

Figure 11:
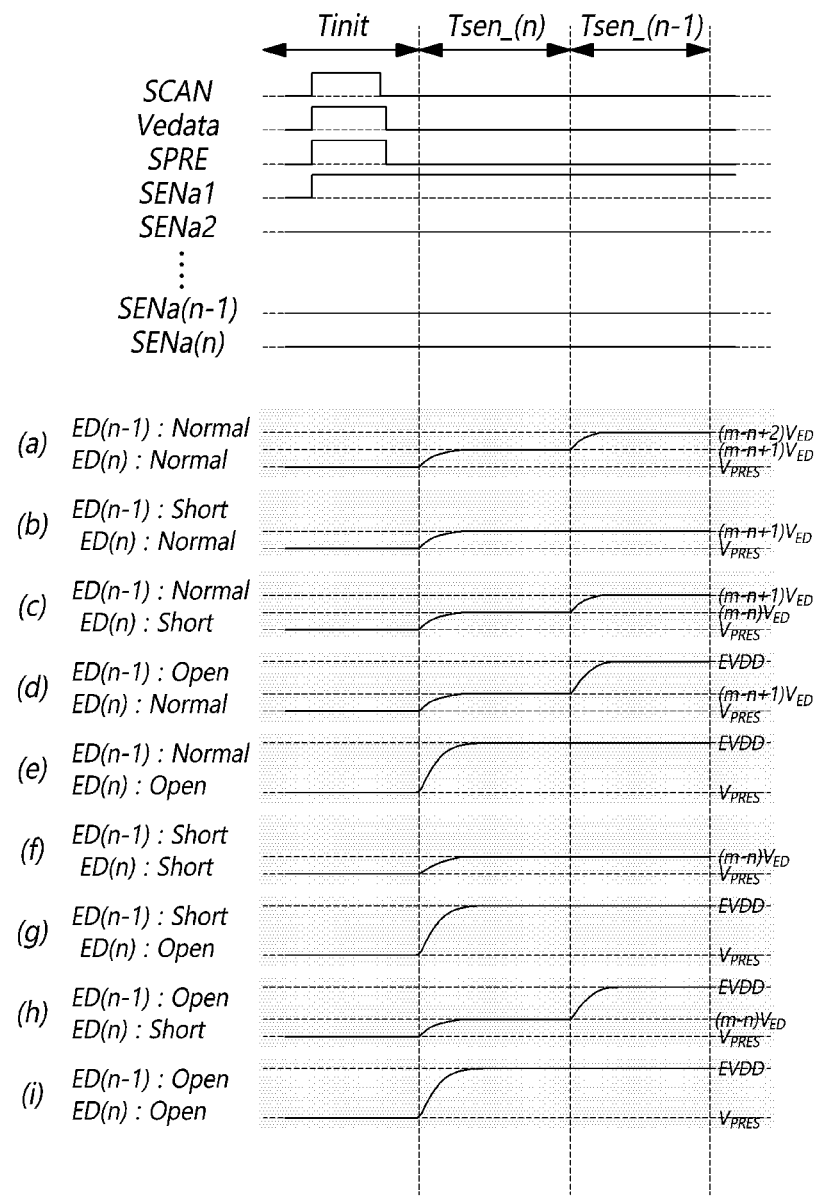

Referring to FIG. 11, the defective light source detection period may proceed in the order of the initialization period Tinit, the nth sensing period Tsen_(n) and the (n−1)th sensing period Tsen_(n−1). In this case, whether the nth light source ED(n) and the (n−1)th light source ED(n−1) are defective may be determined. Although not shown in FIG. 11, by a method for determining whether the nth light source ED(n) and the (n−1)th light source ED(n−1) are defective, whether the remaining light sources ED are defective may be determined.

Assuming that the nth light source ED(n) and the (n−1)th light source ED(n−1) are normal, referring to part (a) of FIG. 11, sensing voltages when light sources are normal may be checked. A sensing voltage may be a voltage for a light emitting node NL which is sensed through the reference voltage line RVL.

During the initialization period Tinit, a voltage for sensing may be supplied to the reference voltage line RVL. Therefore, the voltage for sensing may be sensed through the reference voltage line RVL. The voltage for sensing may be the sensing reference voltage VpreS.

After the initialization period Tinit, the nth sensing period Tsen_(n) may proceed. During the nth sensing period Tsen_(n), the voltage of the nth light emitting node NL(n) may be sensed through the reference voltage line RVL. When the nth light source ED(n) is normal, the normal voltage of the nth light source ED(n) may be sensed through the reference voltage line RVL. The normal voltage of the nth light source ED(n) may be (m−n+1)V_ED. V_ED may be the threshold voltage of a light source ED. "V_ED" described in the present specification may be described as "V ED" or "$V_{ED}$" in the drawing.

After the nth sensing period Tsen_(n), the (n−1)th sensing period Tsen_(n−1) may proceed. During the (n−1)th sensing period Tsen_(n−1), the voltage of the (n−1)th light emitting node NL(n−1) may be sensed through the reference voltage line RVL. When the (n−1)th light source ED(n−1) is normal, the normal voltage of the (n−1)th light source ED(n−1) may be sensed through the reference voltage line RVL. The normal voltage of the (n−1)th light source ED(n−1) may be (m−n+2)V_ED. V_ED may be the threshold voltage of a light source ED.

A short or open defect may occur in a light source ED. Therefore, a light source ED may be in one of three states including normal, short, and open. When a defect occurs in a light source ED, the voltage state of a light emitting node NL may be different from that when the light emitting node NL is normal.

Referring to FIG. 11, nine cases for the states of the nth light source ED(n) and the (n−1)th light source ED(n−1) may be checked, and are shown as parts (a) to (i) in FIG. 11.

When the nth light source ED(n) is normal, the sensing voltage should be (m−n+1)V_ED. However, referring to parts (c), (f) and (h) of FIG. 11, when a short occurs in the nth light source ED(n), it may be checked that the sensing voltage is (m−n)V_ED. Also, referring to parts (e), (g) and (i) of FIG. 11, when an open occurs in the nth light source ED(n), it may be checked that the sensing voltage is the driving voltage EVDD. That is to say, through a difference in voltage level, whether the nth light source ED(n) is short-circuited and whether the nth light source ED(n) is open may be determined.

When the (n−1)th light source ED(n−1) is normal, the sensing voltage should be (m−n+2)V_ED. However, referring to parts (b), (f) and (g) of FIG. 11, when a short occurs in the (n−1)th light source ED(n−1), it may be checked that the sensing voltage is the same as the voltage sensed during the nth sensing period Tsen_(n). In addition, referring to parts (d), (h) and (i) of FIG. 11, when an open occurs in the (n−1)th light source ED(n−1), it may be checked that the sensing voltage is the driving voltage EVDD. That is to say, through a difference in voltage level, whether the (n−1)th light source ED(n−1) is short-circuited and whether the (n−1)th light source ED(n−1) is open may be determined.

The detection of a defective light source described above may be referred to as a first-first embodiment for the light emitting array circuit 910 shown in FIG. 9. Following the first-first embodiment, a first-second embodiment as another defective light source detection method is described. The first-second embodiment is described below with reference to FIGS. 12 and 13.

Figure 12:
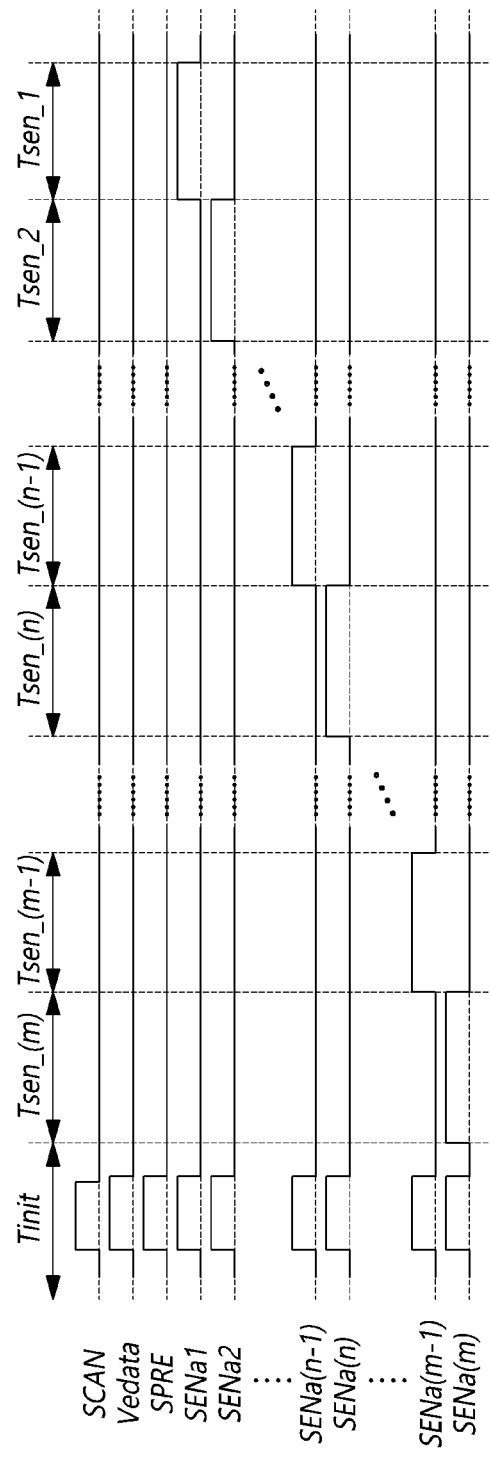

Referring to FIG. 12, a defective light source detection period may include an initialization period Tinit and a plurality of sensing periods Tsen.

The initialization period Tinit may be a period for initializing the voltage state of the light emitting array circuit 910.

During the initialization period Tinit, the scan signal SCAN for turning on the scan transistor SCT may be supplied to the gate node of the scan transistor SCT.

During the initialization period Tinit, the light emitting data voltage Vedata for driving the driving transistor DRT may be supplied to the data line DL.

During the initialization period Tinit, the sensing control signal SPRE for turning on the sensing reference voltage transistor Ts may be supplied to a gate node of the sensing reference voltage transistor Ts.

During the initialization period Tinit, a sense signal SENa for turning on each of the plurality of sensing transistors Ta may be supplied to each of the plurality of sensing transistors Ta.

After the initialization period Tinit, the plurality of sensing periods Tsen may proceed.

The plurality of sensing periods Tsen may be periods for sensing voltages of the plurality of light emitting nodes NL.

Through sensing voltages of two sensing periods Tsen included in the plurality of sensing periods Tsen, whether two light sources ED are defective or not may be determined. Referring to FIG. 12, the plurality of sensing periods Tsen may proceed from an mth sensing period Tsen_(m) to a first sensing period Tsen_1.

During the mth sensing period Tsen_(m), the sense signals SENa may be supplied so that only the mth sensing transistor Ta(m) is turned on. Referring to FIG. 12, during the mth sensing period Tsen_(m), only the mth sense signal SENa(m) may be in a high-level state.

After the mth sensing period Tsen_(m), the (m−1)th sensing period Tsen_(m−1) may proceed. During the (m−1)th sensing period Tsen_(m−1), only the (m−1)th sensing transistor Ta(m−1) may be turned on.

In other words, when the mth sensing period Tsen_(m) to the first sensing period Tsen_1 proceed, the mth sensing transistor Ta(m) to the first sensing transistor Ta1 may be turned on during corresponding periods, respectively.

Referring to FIG. 12, it has been described for the sake of convenience in explanation that the mth sensing period Tsen_(m) to the first sensing period Tsen_1 proceed sequentially, but sensing periods may proceed non-sequentially. For example, the mth sensing period Tsen_(m) may not proceed first, but the nth sensing period Tsen_(n) may proceed first. In this case, after the nth sensing period Tsen_(n) proceeds first, the (n−1)th sensing period Tsen_(n−1) may proceed.

Signals during the initialization period Tinit and the plurality of sensing periods Tsen have been described with reference to FIG. 12, and hereinafter, sensing voltages of the light emitting nodes NL will be described with reference to FIG. 13.

Figure 13:
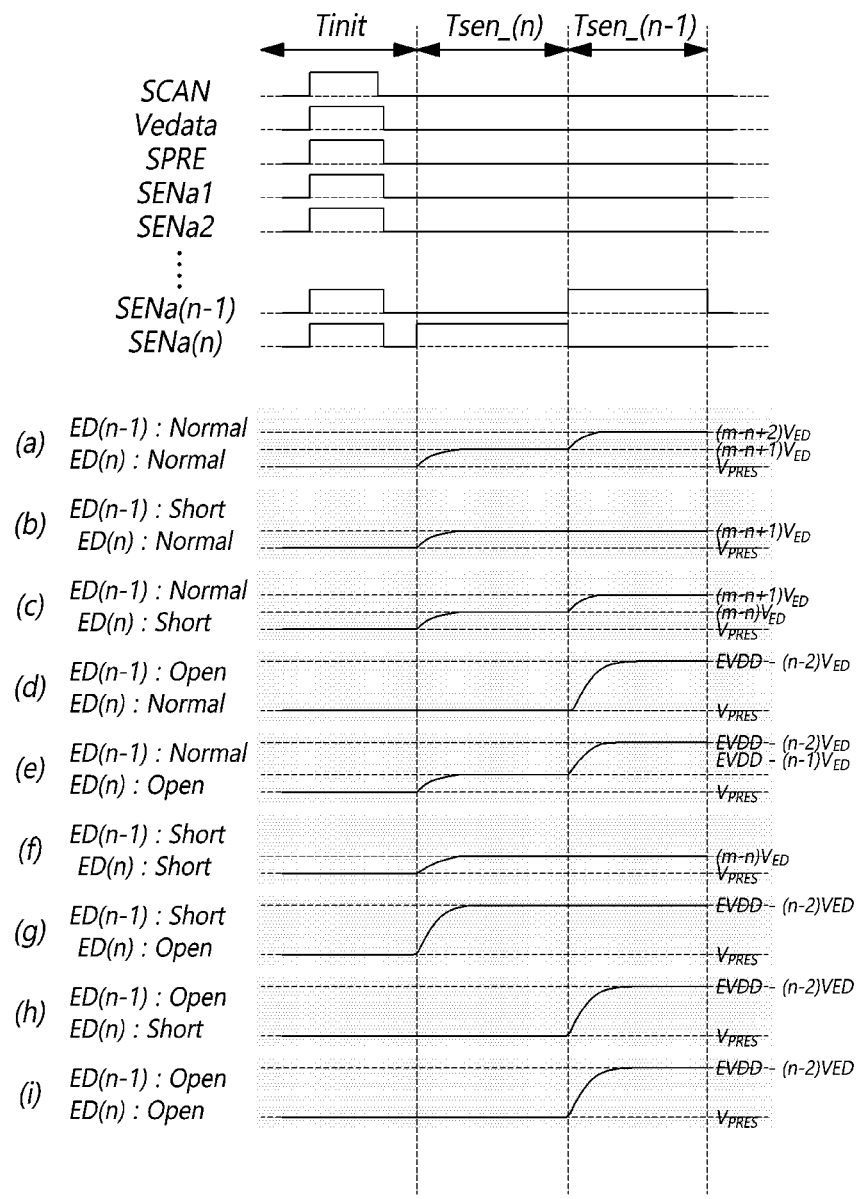

Referring to FIG. 13, the defective light source detection period may proceed in the order of the initialization period Tinit, the nth sensing period Tsen_(n) and the (n−1)th sensing period Tsen_(n−1). In this case, whether the nth light source ED(n) and the (n−1)th light source ED(n−1) are defective may be determined. Although not shown in FIG. 13, by a method for determining whether the nth light source ED(n) and the (n−1)th light source ED(n−1) are defective, whether the remaining light sources ED are defective may be determined.

Assuming that the nth light source ED(n) and the (n−1)th light source ED(n−1) are normal, referring to part (a) of FIG. 13, sensing voltages when light sources are normal may be checked. A sensing voltage may be a voltage for a light emitting node NL which is sensed through the reference voltage line RVL.

A voltage for sensing may be supplied to the reference voltage line RVL during the initialization period Tinit. Therefore, the voltage for sensing may be sensed through the reference voltage line RVL. The voltage for sensing may be the sensing reference voltage VpreS.

After the initialization period Tinit, the nth sensing period Tsen_(n) may proceed. During the nth sensing period Tsen_(n), the voltage of the nth light emitting node NL(n) may be sensed through the reference voltage line RVL. When the nth light source ED(n) is normal, the normal voltage of the nth light source ED(n) may be sensed through the reference voltage line RVL. The normal voltage of the nth light source ED(n) may be (m−n+1)V_ED. V_ED may be the threshold voltage of a light source ED.

After the nth sensing period Tsen_(n), the (n−1)th sensing period Tsen_(n−1) may proceed. During the (n−1)th sensing period Tsen_(n−1), the voltage of the (n−1)th light emitting node NL(n−1) may be sensed through the reference voltage line RVL. When the (n−1)th light source ED(n−1) is normal, the normal voltage of the (n−1)th light source ED(n−1) may be sensed through the reference voltage line RVL. The normal voltage of the (n−1)th light source ED(n−1) may be (m−n+2)V_ED. V_ED may be the threshold voltage of a light source ED.

A short or open defect may occur in a light source ED. Therefore, a light source ED may be in one of three states including normal, short, and open. When a defect occurs in a light source ED, the voltage state of a light emitting node NL may be different from that when the light emitting node NL is normal.

Referring to FIG. 13, nine cases for the states of the nth light source ED(n) and the (n−1)th light source ED(n−1) may be checked, and are shown as parts (a) to (i) in FIG. 13.

When the nth light source ED(n) is normal, the sensing voltage should be (m−n+1)V_ED. However, referring to parts (c), (f) and (h) of FIG. 13, when a short occurs in the nth light source ED(n), it may be checked that the sensing voltage is (m−n)V_ED. In the case of part (h), due to the influence of the (n−1)th light source ED(n−1), it may be checked that the level of the voltage for sensing is sensed during the nth sensing period Tsen_(n). Also, referring to parts (e), (g) and (i) of FIG. 13, when an open occurs in the nth light source ED(n), it may be checked that the sensing voltage is different from the normal voltage in each of parts (e), (g) and (i). That is to say, through a difference in voltage level, whether the nth light source ED(n) is short-circuited and whether the nth light source ED(n) is open may be determined.

When the (n−1)th light source ED(n−1) is normal, the sensing voltage should be (m−n+2)V_ED. However, referring to parts (b), (f) and (g) of FIG. 13, when a short occurs in the (n−1)th light source ED(n−1), it may be checked that the sensing voltage is the same as the voltage sensed during the nth sensing period Tsen_(n). In addition, referring to parts (d), (h) and (i) of FIG. 13, when an open occurs in the (n−1)th light source ED(n−1), it may be checked that the sensing voltage is a defective voltage different from the normal voltage. The sensing voltage when the (n−1)th light source ED(n−1) is open may be EVDD−(n−2)V_ED. That is to say, through a difference in voltage level, whether the (n−1)th light source ED(n−1) is short-circuited and whether the (n−1)th light source ED(n−1) is open may be determined.

When the light emitting array circuit 910 and the data driver circuit 500 shown in FIG. 9 are driven on the basis of the timing diagrams shown in FIGS. 10 to 13, whether a light source ED is defective or not may be determined. The timing diagrams shown in FIGS. 10 to 13 are nothing but mere examples, and whether to control the light emitting array circuit 910 and the data driver circuit 500 shown in FIG. 9 may be set in various ways.

FIG. 14 is a circuit diagram illustrating a light emitting array circuit 1410 and a data driver circuit 500 in accordance with embodiments of the present disclosure. FIGS. 15 to 18 are diagrams for explaining a control method for the light emitting array circuit 1410 in accordance with the embodiments of the present disclosure.

Referring to FIG. 14, the light emitting array circuit 1410 may include a light source array 1411 and a light source driver circuit 1412.

The light source array 1411 may include a plurality of light sources ED. The number of the plurality of light sources ED may be m*2. Referring to FIG. 14, the plurality of light sources ED may include a 11st light source ED11, a 12nd light source ED12, an n1st light source EDn1, an n2nd light source EDn2, an m1st light source EDm1, and an m2nd light source EDm2.

The plurality of light sources ED may be electrically connected between light emitting nodes NL. For example, a first light source may be electrically connected between a first light emitting node and a second light emitting node, and a second light source may be electrically connected between the second light emitting node and a third light emitting node.

Referring to FIG. 14, the 11st light source ED11 may be electrically connected between a 11st light emitting node NL11 and a 12nd light emitting node NL12. The 11st light emitting node NL11 may be a second node N2.

Referring to FIG. 14, the 12nd light source ED12 may be electrically connected between the 12nd light emitting node NL12 and a 21st light emitting node NL21.

Referring to FIG. 14, the n1st light source EDn1 may be electrically connected between an n1st light emitting node NLn1 and an n2nd light emitting node NL12.

Referring to FIG. 14, the n2nd light source EDn2 may be electrically connected between the n2nd light emitting node NLn2 and an (n+1)1st light emitting node.

Referring to FIG. 14, the m1st light source EDm1 may be electrically connected between an m1st light emitting node NLm1 and an m2nd light emitting node NLm2.

Referring to FIG. 14, the m2nd light source EDm2 may be electrically connected between the m2nd light emitting node NLm2 and a node to which a base voltage EVSS is supplied.

The light source driver circuit 1412 may include a driving transistor DRT, a scan transistor SCT, a storage capacitor Cst, and a plurality of sensing transistors Tb.

The driving transistor DRT may be electrically connected between the second node N2 and a third node N3. The third node N3 may be a node to which a driving voltage EVDD is supplied. A gate node of the driving transistor DRT may be electrically connected to a first node N1.

The scan transistor SCT may be electrically connected between a data line DL and the first node N1. A light emitting data voltage Vedata may be supplied to the data line DL. A scan signal SCAN may be supplied to a gate node of the scan transistor SCT.

The storage capacitor Cst may be electrically connected between the first node N1 and the second node N2.

The driving transistor DRT, the scan transistor SCT and storage capacitor Cst shown in FIG. 14 may be the same as the driving transistor DRT, the scan transistor SCT and the storage capacitor Cst shown in FIG. 7.

The number of the plurality of sensing transistors Tb may be m*2. Referring to FIG. 14, the plurality of sensing transistors Tb may include a 11st sensing transistor Tb11, a 12nd sensing transistor Tb12, a 21st sensing transistor Tb21, an n1st sensing transistor Tbn1, an n2nd sensing transistor Tbn2, an m1st sensing transistor Tbm1, and an m2nd sensing transistor Tbm2.

One sense signal SENb may be supplied to gate nodes of two sensing transistors Tb. Referring to FIG. 14, a first sense signal SENb1 may be supplied to a gate node of the 11st sensing transistor Tb11 and a gate node of the 12nd sensing transistor Tb12. A second sense signal SENb2 may be supplied to a gate node of the 21st sensing transistor Tb21 and a gate node of a 22nd sensing transistor Tb22. An nth sense signal SENbn may be supplied to a gate node of the n1st sensing transistor Tbn1 and a gate node of the n2nd sensing transistor Tbn2. An mth sense signal SENbm may be supplied to a gate node of the m1st sensing transistor Tbm1 and a gate node of the m2nd sensing transistor Tbm2.

Among the plurality of sensing transistors Tb, an odd-numbered sensing transistor Tb may be electrically connected between a light emitting node NL and a first reference voltage line RVL1. Among the plurality of sensing transistors Tb, an even-numbered sensing transistor Tb may be electrically connected between a light emitting node NL and a second reference voltage line RVL2.

Referring to FIG. 14, the 11st sensing transistor Tb11 may be electrically connected between the 11st light emitting node NL11 and the first reference voltage line RVL1.

Referring to FIG. 14, the 12nd sensing transistor Tb12 may be electrically connected between the 12nd light emitting node NL12 and the second reference voltage line RVL2.

Referring to FIG. 14, the 21st sensing transistor Tb21 may be electrically connected between the 21st light emitting node NL21 and the first reference voltage line RVL1.

Referring to FIG. 14, the n1st sensing transistor Tbn1 may be electrically connected between the n1st light emitting node NLn1 and the first reference voltage line RVL1.

Referring to FIG. 14, the n2nd sensing transistor Tbn2 may be electrically connected between the n2nd light emitting node NLn2 and the second reference voltage line RVL2.

Referring to FIG. 14, the m1st sensing transistor Tbm1 may be electrically connected between the m1st light emitting node NLm1 and the first reference voltage line RVL1.

Referring to FIG. 14, the m2nd sensing transistor Tbm2 may be electrically connected between the m2nd light emitting node NLm2 and the second reference voltage line RVL2.

The data driver circuit 500 may include a first driving reference voltage transistor Tr1, a first sensing reference voltage transistor Ts1, a second driving reference voltage transistor Tr2 and a second sensing reference voltage transistor Ts2.

The first driving reference voltage transistor Tr1 may be controlled by a first driving control signal RPRE1. Depending on whether the first driving reference voltage transistor Tr1 is controlled, a driving reference voltage VpreR may be supplied to the first reference voltage line RVL1.

The first sensing reference voltage transistor Ts1 may be controlled by a first sensing control signal SPRE1. Depending on whether the first sensing reference voltage transistor Ts1 is controlled, a sensing reference voltage VpreS may be supplied to the first reference voltage line RVL1.

The second driving reference voltage transistor Tr2 may be controlled by a second driving control signal RPRE2. Depending on whether the second driving reference voltage transistor Tr2 is controlled, the driving reference voltage VpreR may be supplied to the second reference voltage line RVL2.

The second sensing reference voltage transistor Ts2 may be controlled by a second sensing control signal SPRE2. Depending on whether the second sensing reference voltage transistor Ts2 is controlled, the sensing reference voltage VpreS may be supplied to the second reference voltage line RVL2.

Whether a light source ED is defective may be determined according to control of the plurality of sensing transistors Tb and signals. The voltage of a light emitting node NL is sensed through the reference voltage line RVL, and on the basis of the sensed voltage, whether a light source ED is defective may be determined. A sensed voltage may vary depending on whether a light source ED is defective or not. A voltage when a light source ED is normal may be checked through a test. If a sensed voltage is different from a voltage when a light source ED is normal, a light source ED may be determined as a defective light source.

The plurality of sensing transistors Tb and signals may be controlled in various ways. Referring to FIGS. 15 to 18, examples in which the plurality of sensing transistors Tb and signals are controlled may be seen.

Figure 15:
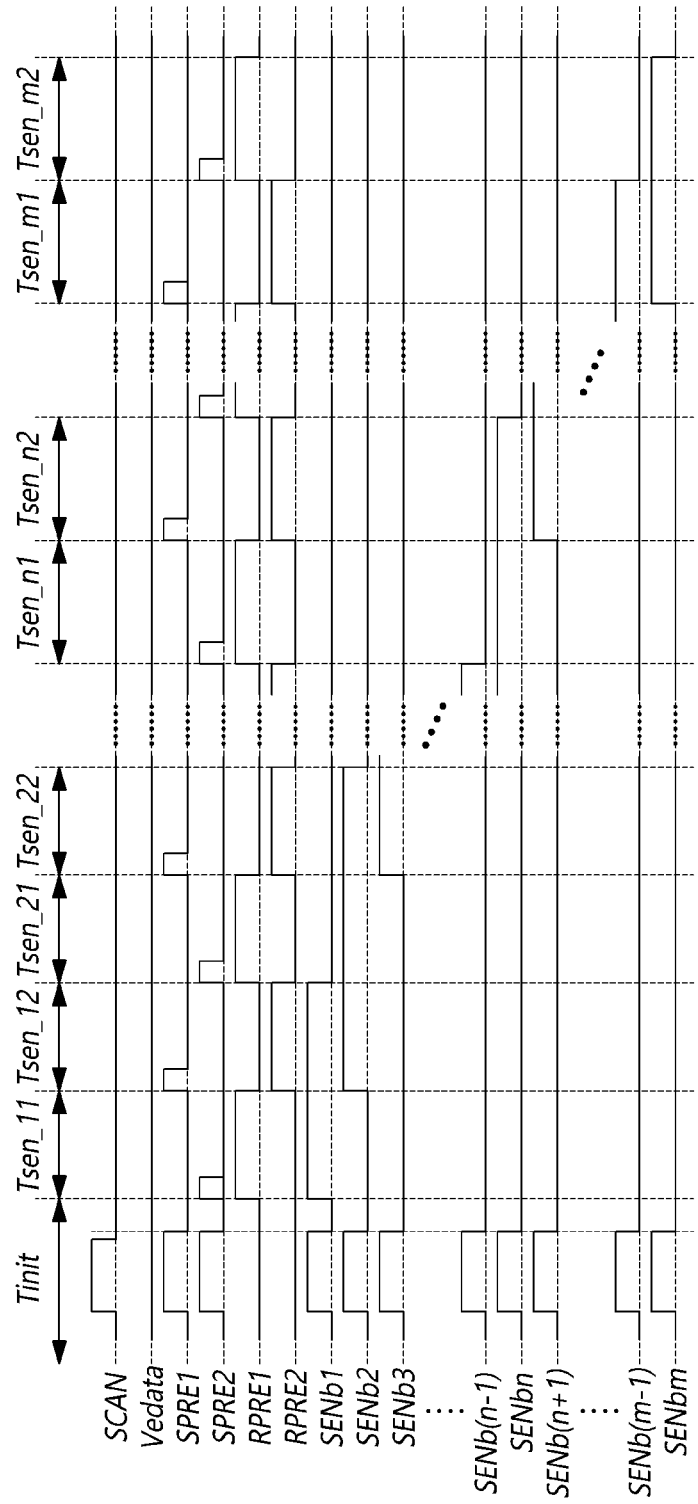
FIGS. 15 to 18 are diagrams for explaining a control method for the light emitting array circuit in accordance with the second embodiment of the present disclosure.

Referring to FIG. 15, a defective light source detection period may include an initialization period Tinit and a plurality of sensing periods Tsen.

The initialization period Tinit may be a period for initializing the voltage state of the light emitting array circuit 1410.

During the initialization period Tinit, the scan signal SCAN for turning on the scan transistor SCT may be supplied to the gate node of the scan transistor SCT.

During the initialization period Tinit, the light emitting data voltage Vedata may not be supplied to the data line DL, or a voltage of 0 [V] may be supplied.

During the initialization period Tinit, the first sensing control signal SPRE1 for turning on the first sensing reference voltage transistor Ts1 may be supplied to a gate node of the first sensing reference voltage transistor Ts1.

During the initialization period Tinit, the second sensing control signal SPRE2 for turning on the second sensing reference voltage transistor Ts2 may be supplied to a gate node of the second sensing reference voltage transistor Ts2.

During the initialization period Tinit, the first driving control signal RPRE1 for maintaining the first driving reference voltage transistor Tr1 in a turned-off state may be supplied to a gate node of the first driving reference voltage transistor Tr1.

During the initialization period Tinit, the second driving control signal RPRE2 for maintaining the second driving reference voltage transistor Tr2 in a turned-off state may be supplied to a gate node of the second driving reference voltage transistor Tr2.

During the initialization period Tinit, a sense signal SEN for turning on each of the plurality of sensing transistors Tb may be supplied to each of the plurality of sensing transistors Tb.

After the initialization period Tinit, the plurality of sensing periods Tsen may proceed.

The plurality of sensing periods Tsen may be periods for sensing voltages of the plurality of light emitting nodes NL.

Through sensing voltages of two sensing periods Tsen included in the plurality of sensing periods Tsen, whether two light sources ED are defective or not may be determined.

The number of the plurality of sensing periods Tsen may be m*2. Referring to FIG. 15, the plurality of sensing periods Tsen may proceed from a 11st sensing period Tsen_11 to an m2nd sensing period Tsen_m2.

Referring to FIG. 15, it has been described for the sake of convenience in explanation that the 11st sensing period Tsen_11 to the m2nd sensing period Tsen_m2 proceed sequentially, but sensing periods may proceed non-sequentially. For example, the 11st sensing period Tsen_11 may not proceed first, but the n1st sensing period Tsen_n1 may proceed first. In this case, after the n1st sensing period Tsen_n1 proceeds first, the n2nd sensing period Tsen_n2 may proceed.

During even-numbered sensing periods Tsen except the m2nd sensing period Tsen_m2, the first sensing control signal SPRE1 may change from a high-level signal state to a low-level signal state. During the m1st sensing period Tsen_m1, the first sensing control signal SPRE1 may change from a high-level signal state to a low-level signal state.

During odd-numbered sensing periods Tsen except the m1st sensing period Tsen_m1, the second sensing control signal SPRE2 may change from a high-level signal state to a low-level signal state. During the m2nd sensing period Tsen_m2, the second sensing control signal SPRE2 may change from a high-level signal state to a low-level signal state.

During the odd-numbered sensing periods Tsen except the m1st sensing period Tsen_m1, the first driving control signal RPRE1 may be in a high-level signal state. During the m2nd sensing period Tsen_m2, the first driving control signal RPRE1 may be in a high-level signal state.

During the even-numbered sensing periods Tsen except the m2nd sensing period Tsen_m2, the second driving control signal RPRE2 may be in a high-level signal state. During the m1st sensing period Tsen_m1, the second driving control signal RPRE2 may be in a high-level signal state.

The first sense signal SENb1 may be in a high-level signal state from the 11st sensing period Tsen_11 to the 12nd sensing period Tsen_12. In other words, the first sense signal SENb1 may be in a high-level signal state for two sensing periods Tsen.

The second sense signal SENb2 may be in a high-level signal state from the 12nd sensing period Tsen_12 to the 22nd sensing period Tsen_22. In other words, the second sense signal SENb2 may be in a high-level signal state for three sensing periods Tsen.

The nth sense signal SENbn may be in a high-level signal state from the (n−1)2nd sensing period Tsen_(n−1)2 to the n2nd sensing period Tsen_n2. In other words, the nth sense signal SENbn may be in a high-level signal state for three sensing periods Tsen.

The (n+1)th sense signal SENb(n+1) may be in a high-level signal state from the n2nd sensing period Tsen_n2 to the (n+1)2nd sensing period Tsen_(n+1)2. In other words, the (n+1)th sense signal SENb(n+1) may be in a high-level signal state for three sensing periods Tsen.

The (m−1)th sense signal SENb(m−1) may be in a high-level signal state from the (m−1)2nd sensing period Tsen_(m−1)2 to the m1st sensing period Tsen_m1. In other words, the (m−1)th sense signal SENb(m−1) may be in a high-level signal state for two sensing periods Tsen.

The mth sense signal SENbm may be in a high-level signal state from the m1st sensing period Tsen_m1 to the m2nd sensing period Tsen_m2.

Signals during the initialization period Tinit and the plurality of sensing periods Tsen have been described with reference to FIG. 15, and hereinafter, sensing voltages of the light emitting nodes NL will be described with reference to FIG. 16.

Figure 16:
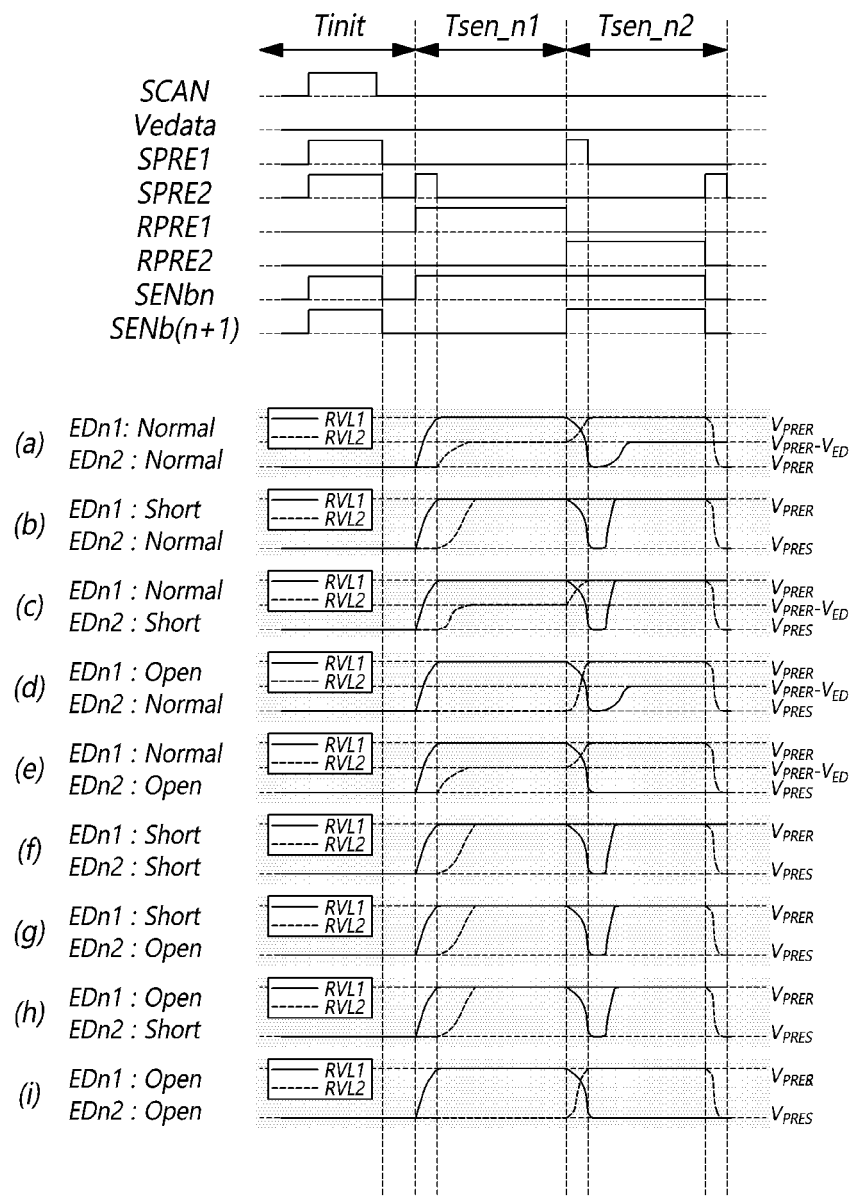

Referring to FIG. 16, the defective light source detection period may proceed in the order of the initialization period Tinit, the n1st sensing period Tsen_n1 and the n2nd sensing period Tsen_n2. In this case, whether the n1st light source EDn1 and the n2nd light source EDn2 are defective may be determined. Although not shown in FIG. 16, by a method for determining whether the n1st light source EDn1 and the n2nd light source EDn2 are defective, whether the remaining light sources ED are defective may be determined.

Assuming that the n1st light source EDn1 and the n2nd light source EDn2 are normal, referring to part (a) of FIG. 16, sensing voltages when light sources are normal may be checked. A sensing voltage may be a voltage for a light emitting node NL which is sensed through the reference voltage line RVL.

During the initialization period Tinit, a voltage for sensing may be supplied to the first reference voltage line RVL1 and the second reference voltage line RVL2. Therefore, the voltage for sensing may be sensed through the first reference voltage line RVL1 and the second reference voltage line RVL2. The voltage for sensing may be the sensing reference voltage VpreS.

After the initialization period Tinit, the n1st sensing period Tsen_n1 may proceed. Since the driving reference voltage VpreR is supplied to the first reference voltage line RVL1 during the n1st sensing period Tsen_n1, the driving reference voltage VpreR may be sensed through the first reference voltage line RVL1. During the n1st sensing period Tsen_n1, the voltage of the n2nd light emitting node NLn2 may be sensed through the second reference voltage line RVL2. When the n1st light source EDn1 is normal, the normal voltage of the n1st light source EDn1 may be sensed through the second reference voltage line RVL2. The normal voltage of the n1st light source EDn1 may be VpreR-V_ED. VpreR may be the driving reference voltage, and V_ED may be the threshold voltage of a light source ED.

After the n1st sensing period Tsen_n1, the n2nd sensing period Tsen_n2 may proceed. Since the driving reference voltage VpreR is supplied to the second reference voltage line RVL2 during the n2nd sensing period Tsen_n2, the driving reference voltage VpreR may be sensed through the second reference voltage line RVL2. During the n2nd sensing period Tsen_n2, the voltage of the n1st light emitting node NLn1 may be sensed through the first reference voltage line RVL1. When the n2nd light source EDn2 is normal, the normal voltage of the n2nd light source EDn2 may be sensed through the first reference voltage line RVL1. The normal voltage of the n2nd light source EDn2 may be VpreR-V_ED. VpreR may be the driving reference voltage, and V_ED may be the threshold voltage of a light source ED.

A short or open defect may occur in a light source ED. Therefore, a light source ED may be in one of three states including normal, short, and open. When a defect occurs in a light source ED, the voltage state of a light emitting node NL may be different from that when the light emitting node NL is normal.

Referring to FIG. 16, nine cases for the states of the n1st light source EDn1 and the n2nd light source EDn2 may be checked, and are shown as parts (a) to (i) in FIG. 16.

When the n1st light source EDn1 is normal, the sensing voltage should be VpreR-V_ED. However, referring to parts (b), (f) and (g) of FIG. 16, when a short occurs in the n1st light source EDn1, it may be checked that the sensing voltage of the first reference voltage line RVL1 and the sensing voltage of the second reference voltage line RVL2 are the same. Also, referring to parts (d), (h) and (i) of FIG. 16, when an open occurs in the n1st light source EDn1, it may be checked that the sensing voltage of the second reference voltage line RVL2 is the sensing reference voltage VpreS. That is to say, through a difference in voltage level, whether the n1st light source EDn1 is short-circuited and whether the n1st light source EDn1 is open may be determined.

When the n2nd light source EDn2 is normal, the sensing voltage should be VpreR-V_ED. However, referring to parts (c), (f) and (h) of FIG. 16, when a short occurs in the n2nd light source EDn2, it may be checked that the sensing voltage of the first reference voltage line RVL1 and the sensing voltage of the second reference voltage line RVL2 are the same. Also, referring to parts (e), (g) and (i) of FIG. 16, when an open occurs in the n2nd light source EDn2, it may be checked that the sensing voltage of the first reference voltage line RVL1 is different the voltage of a normal state. Referring to parts (e) and (i) of FIG. 16, it may be checked that the sensing voltage of the first reference voltage line RVL1 is the sensing reference voltage VpreS. Referring to part (g) of FIG. 16, it may be checked that the sensing voltage of the first reference voltage line RVL1 is sensed as the driving reference voltage VpreR due to the short of the n1st light source EDn1. That is to say, through a difference in voltage level, whether the n2nd light source EDn2 is short-circuited and whether the n2nd light source EDn2 is open may be determined.

The detection of a defective light source described above may be referred to as a second-first embodiment for the light emitting array circuit 1410 shown in FIG. 14. Following the second-first embodiment, a second-second embodiment as another defective light source detection method will be described. The second-second embodiment will be described below with reference to FIGS. 17 and 18.

Figure 17:
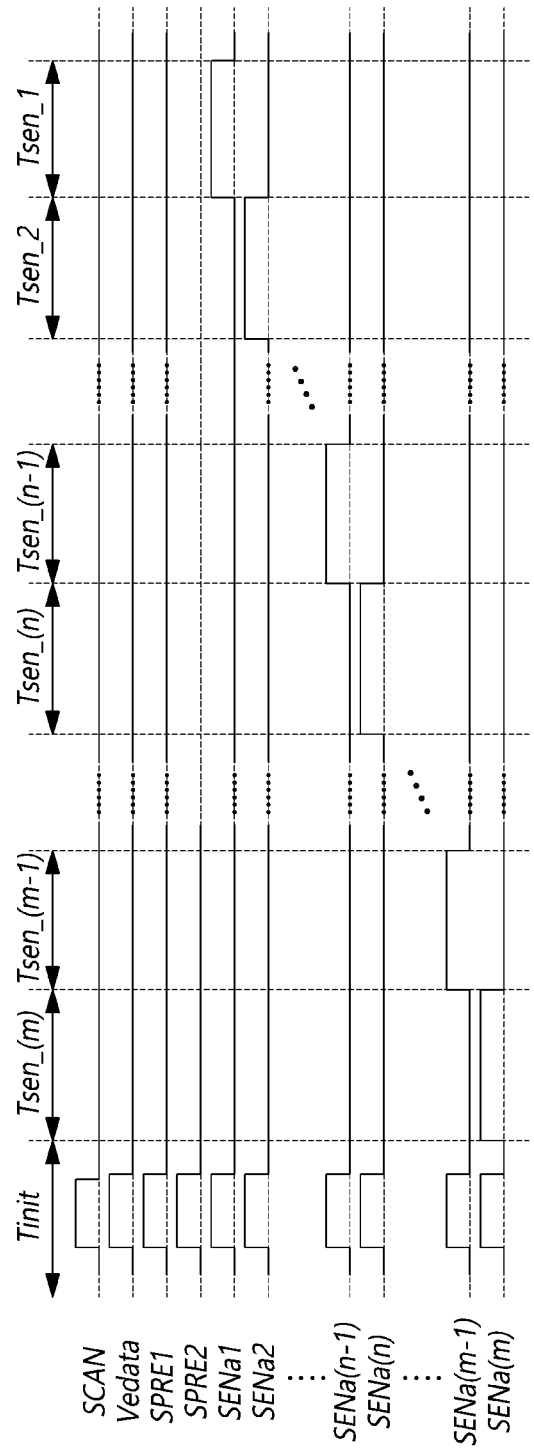

Referring to FIG. 17, a defective light source detection period may include an initialization period Tinit and a plurality of sensing periods Tsen.

The initialization period Tinit may be a period for initializing the voltage state of the light emitting array circuit 1410.

During the initialization period Tinit, the scan signal SCAN for turning on the scan transistor SCT may be supplied to the gate node of the scan transistor SCT.

During the initialization period Tinit, the light emitting data voltage Vedata for driving the driving transistor DRT may be supplied to the data line DL.

During the initialization period Tinit, the first sensing control signal SPRE1 for turning on the first sensing reference voltage transistor Ts1 may be supplied to a gate node of the first sensing reference voltage transistor Ts1.

During the initialization period Tinit, the second sensing control signal SPRE2 for turning on the second sensing reference voltage transistor Ts2 may be supplied to a gate node of the second sensing reference voltage transistor Ts2.

During the initialization period Tinit, a sense signal SENb for turning on each of the plurality of sensing transistors Tb may be supplied to a gate node of each of the plurality of sensing transistors Tb.

After the initialization period Tinit, the plurality of sensing periods Tsen may proceed.

The plurality of sensing periods Tsen may be periods for sensing voltages of the plurality of light emitting nodes NL.

Through sensing voltages of two sensing periods Tsen included in the plurality of sensing periods Tsen, whether two light sources ED are defective or not may be determined. Referring to FIG. 17, the plurality of sensing periods Tsen may proceed from an mth sensing period Tsen_(m) to a first sensing period Tsen_1.

During the mth sensing period Tsen_(m), only the mth sense signal SENb(m) may be in a high-level state. Accordingly, the m1st sensing transistor Tbm1 and the m2nd sensing transistor Tbm2 which are supplied with the mth sense signal SENb(m) may be turned on.

After the mth sensing period Tsen_(m), the (m−1)th sensing period Tsen_(m−1) may proceed. During the (m−1)th sensing period Tsen_(m−1), only the (m−1)th sense signal SENb(m−1) may be in a high-level state. Accordingly, a sensing transistor which is supplied with the (m−1)th sense signal SENb(m−1) may be turned on.

In other words, when the mth sensing period Tsen_(m) to the first sensing period Tsen_1 proceed, sensing transistors which are supplied with the mth sense signal SENb(m) to the first sense signal SENb1 may be turned on during corresponding periods, respectively.

Referring to FIG. 17, it has been described for the sake of convenience in explanation that the mth sensing period Tsen_(m) to the first sensing period Tsen_1 proceed sequentially, but sensing periods may proceed non-sequentially. For example, the mth sensing period Tsen_(m) may not proceed first, but the nth sensing period Tsen_(n) may proceed first. In this case, after the nth sensing period Tsen_(n) proceeds first, the (n−1)th sensing period Tsen_(n−1) may proceed.

Signals during the initialization period Tinit and the plurality of sensing periods Tsen have been described with reference to FIG. 17, and hereinafter, sensing voltages of the light emitting nodes NL will be described with reference to FIG. 18.

Figure 18:
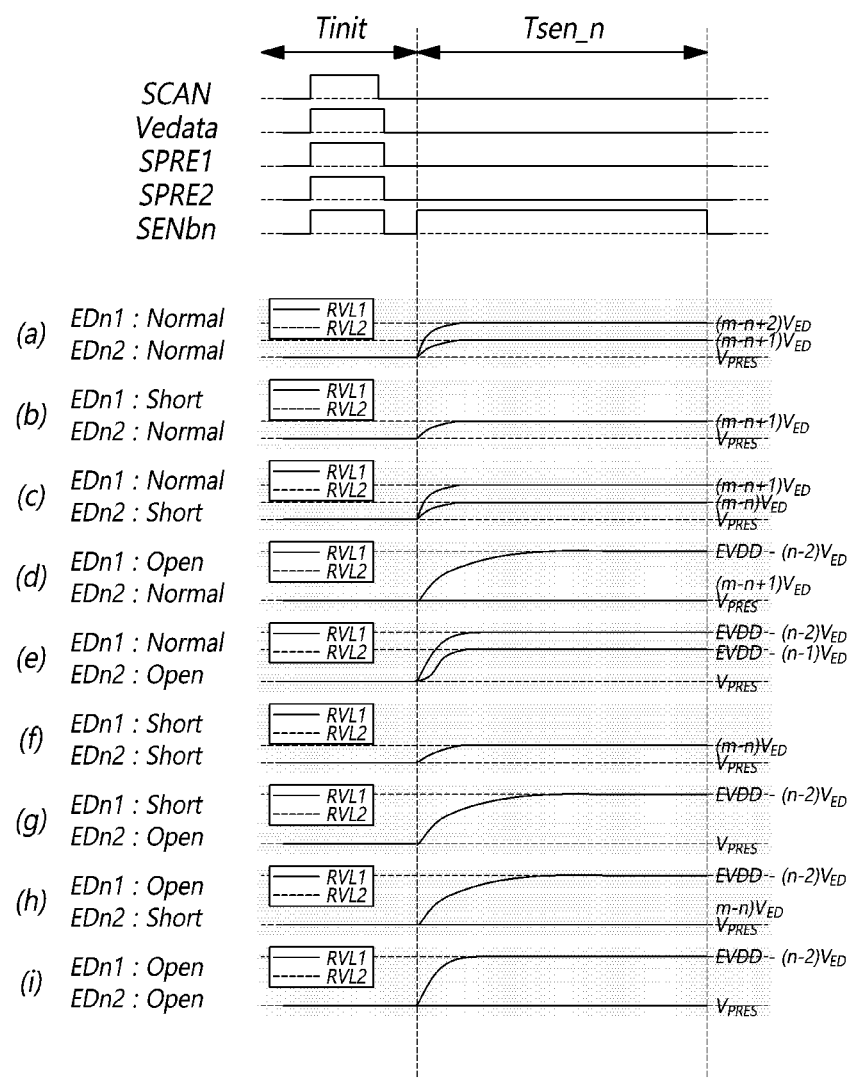

Referring to FIG. 18, the defective light source detection period may proceed in the order of the initialization period Tinit and the nth sensing period Tsen_n. In this case, whether the n1st light source EDn1 and the n2nd light source EDn2 are defective may be determined. Although not shown in FIG. 18, by a method for determining whether the n1st light source EDn1 and the n2nd light source EDn2 are defective, whether the remaining light sources ED are defective may be determined.

Assuming that the n1st light source EDn1 and the n2nd light source EDn2 are normal, referring to part (a) of FIG. 18, sensing voltages when light sources are normal may be checked. Sensing voltages may be voltages for light emitting nodes NL sensed through the first reference voltage line RVL1 and the second reference voltage line RVL2.

During the initialization period Tinit, a voltage for sensing may be supplied to the first reference voltage line RVL1 and the second reference voltage line RVL2. Therefore, the voltage for sensing may be sensed through the first reference voltage line RVL1 and the second reference voltage line RVL2. The voltage for sensing may be the sensing reference voltage VpreS.

After the initialization period Tinit, the nth sensing period Tsen_(n) may proceed. During the nth sensing period Tsen_n, the voltage of the n1st light emitting node NLn1 may be sensed through the first reference voltage line RVL1. When the n1st light source EDn1 is normal, the normal voltage of the n1st light source EDn1 may be sensed through the first reference voltage line RVL1. The normal voltage of the n1st light source EDn1 may be (m−n+2)V_ED. V_ED may be the threshold voltage of a light source ED.

In addition, during the nth sensing period Tsen_n, the voltage of the n2nd light emitting node NLn2 may be sensed through the second reference voltage line RVL2. When the n2nd light source EDn2 is normal, the normal voltage of the n2nd light source EDn2 may be sensed through the second reference voltage line RVL2. The normal voltage of the n2nd light source EDn2 may be (m−n+1)V_ED. V_ED may be the threshold voltage of a light source ED.

A short or open defect may occur in a light source ED. Therefore, a light source ED may be in one of three states including normal, short, and open. When a defect occurs in a light source ED, the voltage state of a light emitting node NL may be different from that when the light emitting node NL is normal.

Referring to FIG. 18, nine cases for the states of the n1st light source EDn1 and the n2nd light source EDn2 may be checked, and are shown as parts (a) to (i) in FIG. 18.

When the n1st light source EDn1 is normal, the sensing voltage of the first reference voltage line RVL1 should be (m−n+2)V_ED. However, referring to parts (b), (f) and (g) of FIG. 18, when a short occurs in the n1st light source EDn1, it may be checked that the sensing voltage of the first reference voltage line RVL1 and the sensing voltage of the second reference voltage line RVL2 are the same. In addition, referring to parts (d), (h) and (i) of FIG. 18, when an open occurs in the n1st light source EDn1, it may be checked that the sensing voltage is a defective voltage different from the normal voltage. The sensing voltage when the n1st light source EDn1 is open may be EVDD-(n−2)V_ED. That is to say, through a difference in voltage level, whether the n1st light source EDn1 is short-circuited and whether the n1st light source EDn1 is open may be determined.

When the n2nd light source EDn2 is normal, the sensing voltage of the second reference voltage line RVL2 should be (m−n+1)V_ED. However, referring to parts (c), (f) and (h) of FIG. 18, when a short occurs in the n2nd light source EDn2, it may be checked that the sensing voltage is (m−n)V_ED. In the case of part (h), due to the open defect of the n1st light source EDn1, it may be checked that the voltage of EVDD-(n−2)V_ED is sensed during the nth sensing period Tsen_(n). Also, referring to parts (e), (g) and (i) of FIG. 18, when an open occurs in the n2nd light source EDn2, it may be checked that the sensing voltage is different from the normal voltage in each of parts (e), (g) and (i). That is to say, through a difference in voltage level, whether the n2nd light source EDn2 is short-circuited and whether the n2nd light source EDn2 is open may be determined.

When the light emitting array circuit 1410 and the data driver circuit 500 shown in FIG. 14 are driven on the basis of the timing diagrams shown in FIGS. 15 to 18, whether a light source ED is defective or not may be determined. The timing diagrams shown in FIGS. 15 to 18 are nothing but mere examples, and whether to control the light emitting array circuit 1410 and the data driver circuit 500 shown in FIG. 14 may be set in various ways.

FIG. 19 is a circuit diagram illustrating a light emitting array circuit 1910 and a data driver circuit 500 in accordance with embodiments of the present disclosure. FIGS. 20 to 23 are diagrams for explaining a control method for the light emitting array circuit 1910 in accordance with the embodiments of the present disclosure.

Referring to FIG. 19, the light emitting array circuit 1910 may include a light source array 1911 and a light source driver circuit 1912.

The light source array 1911 may include a plurality of light sources ED. Referring to FIG. 19, the number of the plurality of light sources ED may be m*2, and the plurality of light sources ED may include a 11st light source ED11, a 12nd light source ED12, an n1st light source EDn1, an n2nd light source EDn2, an m1st light source EDm1, and an m2nd light source EDm2.

The plurality of light sources ED may be electrically connected between light emitting nodes NL. For example, a first light source may be electrically connected between a first light emitting node and a second light emitting node, and a second light source may be electrically connected between the second light emitting node and a third light emitting node.

Referring to FIG. 19, the 11st light source ED11 may be electrically connected between a 11st light emitting node NL11 and a 12nd light emitting node NL12. The 11st light emitting node NL11 may be a second node N2.

Referring to FIG. 19, the 12nd light source ED12 may be electrically connected between the 12nd light emitting node NL12 and a 21st light emitting node NL21.

Referring to FIG. 19, the n1st light source EDn1 may be electrically connected between an n1st light emitting node NLn1 and an n2nd light emitting node NL12.

Referring to FIG. 19, the n2nd light source EDn2 may be electrically connected between the n2nd light emitting node NLn2 and an (n+1)1st light emitting node NL(n+1)1.

Referring to FIG. 19, the m1st light source EDm1 may be electrically connected between an m1st light emitting node NLm1 and an m2nd light emitting node NLm2.

Referring to FIG. 19, the m2nd light source EDm2 may be electrically connected between the m2nd light emitting node NLm2 and a node to which a base voltage EVSS is supplied.

The light source driver circuit 1912 may include a driving transistor DRT, a scan transistor SCT, a storage capacitor Cst, and a plurality of sensing transistors Tc.

The driving transistor DRT may be electrically connected between the second node N2 and a third node N3. The third node N3 may be a node to which a driving voltage EVDD is supplied. A gate node of the driving transistor DRT may be electrically connected to a first node N1.

The scan transistor SCT may be electrically connected between a data line DL and the first node N1. A light emitting data voltage Vedata may be supplied to the data line DL. A scan signal SCAN may be supplied to a gate node of the scan transistor SCT.

The storage capacitor Cst may be electrically connected between the first node N1 and the second node N2.

The driving transistor DRT, the scan transistor SCT and storage capacitor Cst shown in FIG. 19 may be the same as the driving transistor DRT, the scan transistor SCT and the storage capacitor Cst shown in FIG. 7.

The number of the plurality of sensing transistors Tc may be m*3. Referring to FIG. 19, the plurality of sensing transistors Tc may include a 11st sensing transistor Tc11, a 12nd sensing transistor Tc12, a 13rd sensing transistor Tc13, an n1st sensing transistor Tcn1, an n2nd sensing transistor Tcn2, an n3rd sensing transistor Tcn3, an m1st sensing transistor Tcm1, an m2nd sensing transistor Tcm2, and an m3trd sensing transistor Tcm3.

Referring to FIG. 19, electrical connection relationships of the plurality of sensing transistors Tc may be as follows.

The 11st sensing transistor Tc11 may be electrically connected between the 11st light emitting node NL11 and a reference voltage line RVL.

The 12nd sensing transistor Tc12 may be electrically connected between the 12nd light emitting node NL12 and the reference voltage line RVL.

The 13rd sensing transistor Tc13 may be electrically connected between a select voltage line SELVL and a gate node of the 12nd sensing transistor Tc12.

A first capacitor C1 may be electrically connected between the gate node of the 12nd sensing transistor Tc12 and the reference voltage line RVL.

A first sense signal SENc1 may be supplied to a gate node of the 11st sensing transistor Tc11 and a gate node of the 13rd sensing transistor Tc13.

The n1st sensing transistor Tcn1 may be electrically connected between the n1st light emitting node NLn1 and the reference voltage line RVL.

The n2nd sensing transistor Tcn2 may be electrically connected between the n2nd light emitting node NLn2 and the reference voltage line RVL.

The n3rd sensing transistor Tcn3 may be electrically connected between the select voltage line SELVL and a gate node of the n2nd sensing transistor Tcn2.

An nth capacitor Cn may be electrically connected between the gate node of the n2nd sensing transistor Tcn2 and the reference voltage line RVL.

An nth sense signal SENcn may be supplied to a gate node of the n1st sensing transistor Tcn1 and a gate node of the n3rd sensing transistor Tcn3.

The m1st sensing transistor Tcm1 may be electrically connected between the m1st light emitting node NLm1 and the reference voltage line RVL.

The m2nd sensing transistor Tcm2 may be electrically connected between the m2nd light emitting node NLm2 and the reference voltage line RVL.

The m3rd sensing transistor Tcm3 may be electrically connected between the select voltage line SELVL and a gate node of the m2nd sensing transistor Tcm2.

An mth capacitor Cm may be electrically connected between the gate node of the m2nd sensing transistor Tcm2 and the reference voltage line RVL.

An mth sense signal SENcm may be supplied to a gate node of the m1st sensing transistor Tcm1 and a gate node of the m3rd sensing transistor Tcm3.

The data driver circuit 500 may include a driving reference voltage transistor Tr and a sensing reference voltage transistor Ts.

The driving reference voltage transistor Tr may be controlled by a driving control signal RPRE. Depending on whether the driving reference voltage transistor Tr is controlled, a driving reference voltage VpreR may be supplied to the reference voltage line RVL.

The sensing reference voltage transistor Ts may be controlled by a sensing control signal SPRE. Depending on whether the sensing reference voltage transistor Ts is controlled, a sensing reference voltage VpreS may be supplied to the reference voltage line RVL.

Whether a light source ED is defective may be determined according to control of the plurality of sensing transistors Tc and signals. The voltage of a light emitting node NL is sensed through the reference voltage line RVL, and on the basis of the sensed voltage, whether a light source ED is defective may be determined. A sensed voltage may vary depending on whether a light source ED is defective or not. A voltage when a light source ED is normal may be checked through a test. If a sensed voltage is different from a voltage when a light source ED is normal, a light source ED may be determined as a defective light source.

The plurality of sensing transistors Tc and signals may be controlled in various ways. Referring to FIGS. 20 to 23, examples in which the plurality of sensing transistors Tc and signals are controlled may be seen.

Figure 20:
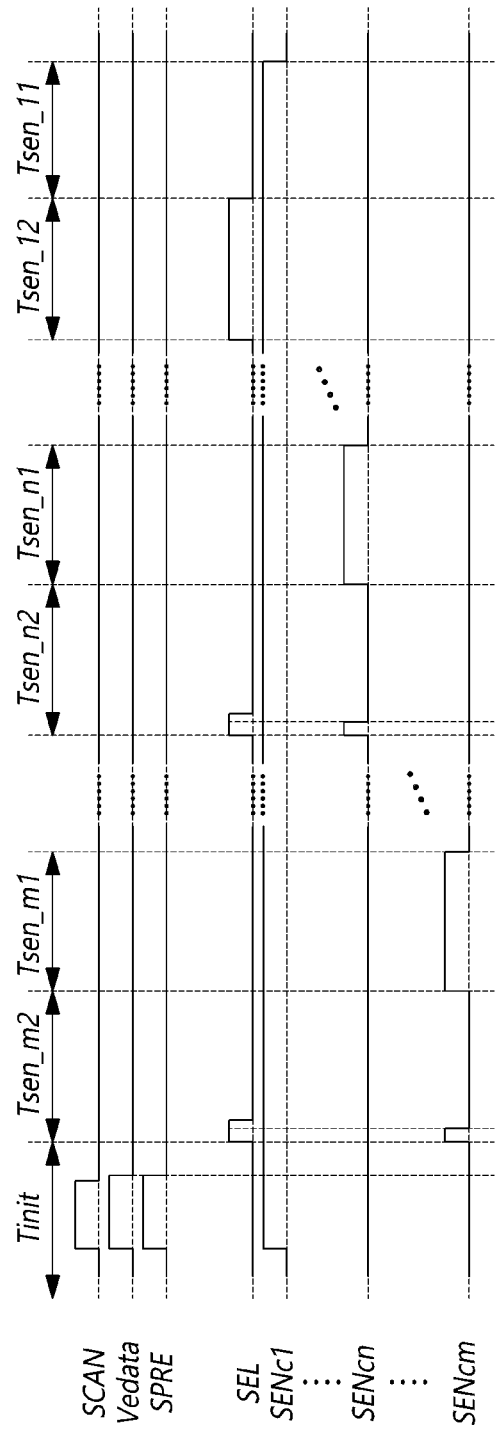
FIGS. 20 to 23 are diagrams for explaining a control method for the light emitting array circuit in accordance with the third embodiment of the present disclosure.

Referring to FIG. 20, a defective light source detection period may include an initialization period Tinit and a plurality of sensing periods Tsen.

The initialization period Tinit may be a period for initializing the voltage state of the light emitting array circuit 1910.

During the initialization period Tinit, the scan signal SCAN for turning on the scan transistor SCT may be supplied to the gate node of the scan transistor SCT.

During the initialization period Tinit, the light emitting data voltage Vedata for driving the driving transistor DRT may be supplied to the data line DL.

During the initialization period Tinit, the sensing control signal SPRE for turning on the sensing reference voltage transistor Ts may be supplied to a gate node of the sensing reference voltage transistor Ts.

During the initialization period Tinit, a select voltage SEL of a low-level state may be supplied to the select voltage line SELVL.

During the initialization period Tinit, the first sense signal SENc1 for turning on the 11st sensing transistor Tc11 may be supplied to the 1st sensing transistor Tc11. During the initialization period Tinit, the remaining sense signals SENc other than the first sense signal SENc1 may have a level opposite to that of the first sense signal SENc1. For example, when the first sense signal SENc1 is a high-level signal, the remaining sense signals SENc may be low-level signals.

After the initialization period Tinit, the plurality of sensing periods Tsen may proceed.

The plurality of sensing periods Tsen may be periods for sensing voltages of the plurality of light emitting nodes NL.

Through sensing voltages of two sensing periods Tsen included in the plurality of sensing periods Tsen, whether two light sources ED are defective or not may be determined.

The number of the plurality of sensing periods Tsen may be m*2. Referring to FIG. 20, the plurality of sensing periods Tsen may proceed from an m2nd sensing period Tsen_m2 to a 11st sensing period Tsen_11.

Referring to FIG. 20, it has been described for the sake of convenience in explanation that the m2nd sensing period Tsen_m2 to the 11st sensing period Tsen_11 proceed sequentially, but sensing periods may proceed non-sequentially. For example, the m2nd sensing period Tsen_m2 may not proceed first, but the n2nd sensing period Tsen_n2 may proceed first. In this case, after the n2nd sensing period Tsen_n2 proceeds first, the n1st sensing period Tsen_n1 may proceed.

The plurality of sensing periods Tsen may proceed in order in which an a1st sensing period proceeds after an a2nd sensing period. That is to say, the plurality of sensing periods Tsen may proceed in a manner in which the a2nd sensing period and the a1st sensing period are alternated. The a2nd sensing period may be referred to as a front-end period, and the a1st sensing period may be referred to as a rear end period. Therefore, an ath sensing period may include the a2nd sensing period as the front-end period and the a1st sensing period as rear end period.

The first sense signal SENc1 may be in a high-level signal state during the initialization period Tinit and the plurality of sensing periods Tsen.

In front-end periods except the 12nd sensing period Tsen_12, a sense signal SENc corresponding to each of the front-end periods may change from a high-level state to a low-level state. Referring to FIG. 20, during the m2nd sensing period Tsen_m2 as the front-end period, the mth sense signal SENcm may change from a high-level state to a low-level state. During the n2nd sensing period Tsen_n2 as the front-end period, the nth sense signal SENcn may change from a high-level state to a low-level state. Although not shown in FIG. 20, during the 22nd sensing period as the front-end period, a second sense signal may change from a high-level state to a low-level state.

In the front-end periods except the 12nd sensing period Tsen_12, the select voltage SEL may change from a high-level state to a low-level state. When a sense signal SENc is in a high-level state, the select voltage SEL may also be in a high-level state. The high-level state of the select voltage SEL may be maintained a little longer than the high-level state of the sense signal SENc. In other words, the select voltage SEL may become a low-level state after the sense signal SENc becomes a low-level state.

In rear end periods except the 11st sensing period Tsen_11, a sense signal SENc corresponding to each of the rear end periods may be in a high-level state. Referring to FIG. 20, during the m1st sensing period Tsen_m1 as the rear end period, the mth sense signal SENcm may be in a high-level state. During the n1st sensing period Tsen_n1 as the rear end period, the nth sense signal SENcn may be in a high-level state. Although not shown in FIG. 20, during the 21st sensing period as the rear end period, the second sense signal may be in a high-level state.

In the rear end periods except the 11st sensing period Tsen_11, the select voltage SEl may be in a low-level state.

After the 21st sensing period Tsen_21, the 12nd sensing period Tsen_12 may proceed.

During the 12nd sensing period Tsen_12, the select voltage SEL may be in a high-level state. During the 12nd sensing period Tsen_12, the remaining sense signals SENc except the first sense signal SENc1 may be in a low-level state.

After the 12nd sensing period Tsen_12, the 11st sensing period Tsen_11 may proceed. During the 11st sensing period Tsen_11, the select voltage SEL may be in a low-level state. During the 11st sensing period Tsen_11, the remaining sense signals SENc except the first sense signal SENc1 may be in a low-level state.

Signals during the initialization period Tinit and the plurality of sensing periods Tsen have been described with reference to FIG. 20, and hereinafter, sensing voltages of the light emitting nodes NL will be described with reference to FIG. 21.

Figure 21:
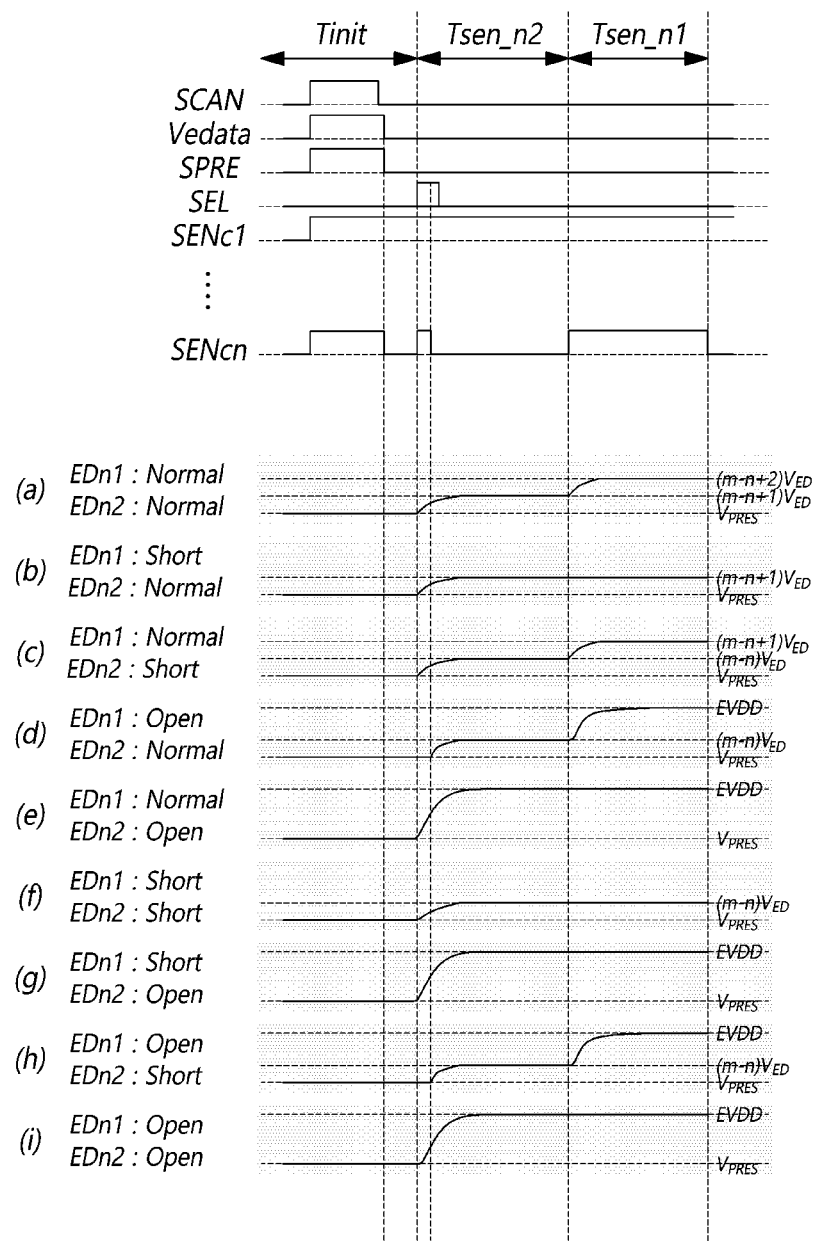

Referring to FIG. 21, the defective light source detection period may proceed in the order of the initialization period Tinit, the n2nd sensing period Tsen_n2 and the n1st sensing period Tsen_n1. In this case, whether the n2nd light source EDn2 and the n1st light source EDn1 are defective may be determined. Although not shown in FIG. 21, by a method for determining whether the n2nd light source EDn2 and the n1st light source EDn1 are defective, whether the remaining light sources ED are defective may be determined.

Assuming that the n2nd light source EDn2 and the n1st light source EDn1 are normal, referring to part (a) of FIG. 21, sensing voltages when light sources are normal may be checked. A sensing voltage may be a voltage for a light emitting node NL which is sensed through the reference voltage line RVL.

During the initialization period Tinit, a voltage for sensing may be supplied to the reference voltage line RVL. Therefore, the voltage for sensing may be sensed through the reference voltage line RVL. When the voltage for sensing is the sensing reference voltage VpreS, the sensing reference voltage VpreS may be sensed.

After the initialization period Tinit, the n2nd sensing period Tsen_n2 may proceed. During the n2nd sensing period Tsen_n2, the voltage of the n2nd light emitting node NLn2 may be sensed through the reference voltage line RVL. When the n2nd light source EDn2 is normal, the normal voltage of the n2nd light source EDn2 may be sensed through the reference voltage line RVL. The normal voltage of the n2nd light source EDn2 may be $(m-n+1)V\_ED$. $V\_ED$ may be the threshold voltage of a light source ED.

After the n2nd sensing period Tsen_n2, the n1st sensing period Tsen_n1 may proceed. During the n1st sensing period Tsen_n1, the voltage of the n1st light emitting node NLn1 may be sensed through the reference voltage line RVL. When the n1st light source EDn1 is normal, the normal voltage of the n1st light source EDn1 may be sensed through the reference voltage line RVL. The normal voltage of the n1st light source EDn1 may be $(m-n+2)V\_ED$. $V\_ED$ may be the threshold voltage of a light source ED.

A short or open defect may occur in a light source ED. Therefore, a light source ED may be in one of three states including normal, short, and open. When a defect occurs in a light source ED, the voltage state of a light emitting node NL may be different from that when the light emitting node NL is normal.

Referring to FIG. 21, nine cases for the states of the n2nd light source EDn2 and the n1st light source EDn1 may be checked, and are shown as parts (a) to (i) in FIG. 21.

When the n2nd light source EDn2 is normal, the sensing voltage should be $(m-n+1)V\_ED$. However, referring to parts (c), (f) and (h) of FIG. 21, when a short occurs in the n2nd light source EDn2, it may be checked that the sensing voltage is $(m-n)V\_ED$. Also, referring to parts (e), (g) and (i) of FIG. 21, when an open occurs in the n2nd light source EDn2, it may be checked that the sensing voltage is the driving voltage EVDD. That is to say, through a difference in voltage level, whether the n2nd light source EDn2 is short-circuited and whether the n2nd light source EDn2 is open may be determined.

When the n1st light source EDn1 is normal, the sensing voltage should be $(m-n+2)V\_ED$. However, referring to parts (b), (f) and (g) of FIG. 21, when a short occurs in the n1st light source EDn1, it may be checked that the sensing voltage is the same as the voltage sensed during the n2nd sensing period Tsen_n2. Also, referring to parts (d), (h) and (i) of FIG. 21, when an open occurs in the n1st light source EDn1, it may be checked that the sensing voltage is the driving voltage EVDD. That is to say, through a difference in voltage level, whether the n1st light source EDn1 is short-circuited and whether the n1st light source EDn1 is open may be determined.

The detection of a defective light source described above may be referred to as a third-first embodiment for the light emitting array circuit 1910 shown in FIG. 19. Following the third-first embodiment, a third-second embodiment as another defective light source detection method will be described. The second-second embodiment will be described below with reference to FIGS. 22 and 23.

Figure 22:
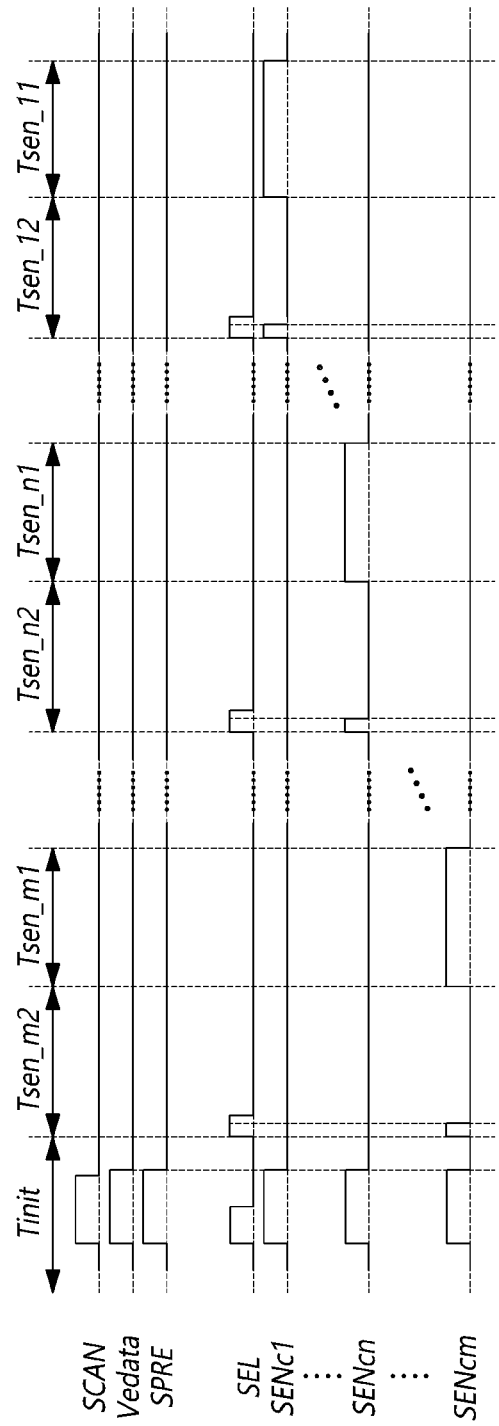

Referring to FIG. 22, a defective light source detection period may include an initialization period Tinit and a plurality of sensing periods Tsen.

The initialization period Tinit may be a period for initializing the voltage state of the light emitting array circuit 1910.

During the initialization period Tinit, the scan signal SCAN for turning on the scan transistor SCT may be supplied to the gate node of the scan transistor SCT.

During the initialization period Tinit, the light emitting data voltage Vedata for driving the driving transistor DRT may be supplied to the data line DL.

During the initialization period Tinit, the sensing control signal SPRE for turning on the sensing reference voltage transistor Ts may be supplied to a gate node of the sensing reference voltage transistor Ts.

During the initialization period Tinit, the select voltage SEL may be supplied to the select voltage line SELVL. During the initialization period Tinit, the select voltage SEL may change from a high-level state to a low-level state.

During the initialization period Tinit, a sense signal SENc for turning on each of the plurality of sensing transistors Tc may be supplied to each of the plurality of sensing transistors Tc.

After the initialization period Tinit, the plurality of sensing periods Tsen may proceed.

The plurality of sensing periods Tsen may be periods for sensing voltages of the plurality of light emitting nodes NL.

Through sensing voltages of two sensing periods Tsen included in the plurality of sensing periods Tsen, whether two light sources ED are defective or not may be determined.

The number of the plurality of sensing periods Tsen may be m*2. Referring to FIG. 22, the plurality of sensing periods Tsen may proceed from an m2nd sensing period Tsen_m2 to a 11st sensing period Tsen_11.

Referring to FIG. 22, it has been described for the sake of convenience in explanation that the m2nd sensing period Tsen_m2 to the 11st sensing period Tsen_11 proceed sequentially, but sensing periods may proceed non-sequentially. For example, the m2nd sensing period Tsen_m2 may not proceed first, but the n2nd sensing period Tsen_n2 may proceed first. In this case, after the n2nd sensing period Tsen_n2 proceeds first, the n1st sensing period Tsen_n1 may proceed.

The plurality of sensing periods Tsen may proceed in order in which an a1st sensing period proceeds after an a2nd sensing period. That is to say, the plurality of sensing periods Tsen may proceed in a manner in which the a2nd sensing period and the a1st sensing period are alternated. The a2nd sensing period may be referred to as a front-end period, and the a1st sensing period may be referred to as a rear end period. Therefore, an ath sensing period may include the a2nd sensing period as the front-end period and the a1st sensing period as rear end period.

In front-end periods among the plurality of sensing periods Tsen, a sense signal SENc corresponding to each of the front-end periods may change from a high-level state to a low-level state. Referring to FIG. 22, during the m2nd sensing period Tsen_m2 as the front-end period, the mth sense signal SENcm may change from a high-level state to a low-level state. During the n2nd sensing period Tsen_n2 as the front-end period, the nth sense signal SENcn may change from a high-level state to a low-level state. During the 12nd sensing period as the front-end period, the first sense signal SENc1 may change from a high-level state to a low-level state.

In the front-end periods among the plurality of sensing periods Tsen, the select voltage SEL may change from a high-level state to a low-level state. When a sense signal SENc is in a high-level state, the select voltage SEL may also be in a high-level state. The high-level state of the select voltage SEL may be maintained a little longer than the high-level state of the sense signal SENc. In other words, the select voltage SEL may become a low-level state after the sense signal SENc becomes a low-level state.

In rear end periods among the plurality of sensing periods Tsen, a sense signal SENc corresponding to each of the rear end periods may be in a high-level state. Referring to FIG. 22, during the m1st sensing period Tsen_m1 as the rear end period, the mth sense signal SENcm may be in a high-level state. During the n1st sensing period Tsen_n1 as the rear end period, the nth sense signal SENcn may be in a high-level state. During the 11st sensing period Tsen_11 as the rear end period, the first sense signal SENc1 may be in a high-level state.

In the rear end periods among the plurality of sensing periods Tsen, the select voltage SEl may be in a low-level state.

Signals during the initialization period Tinit and the plurality of sensing periods Tsen have been described with reference to FIG. 22, and hereinafter, sensing voltages of the light emitting nodes NL will be described with reference to FIG. 23.

Figure 23:
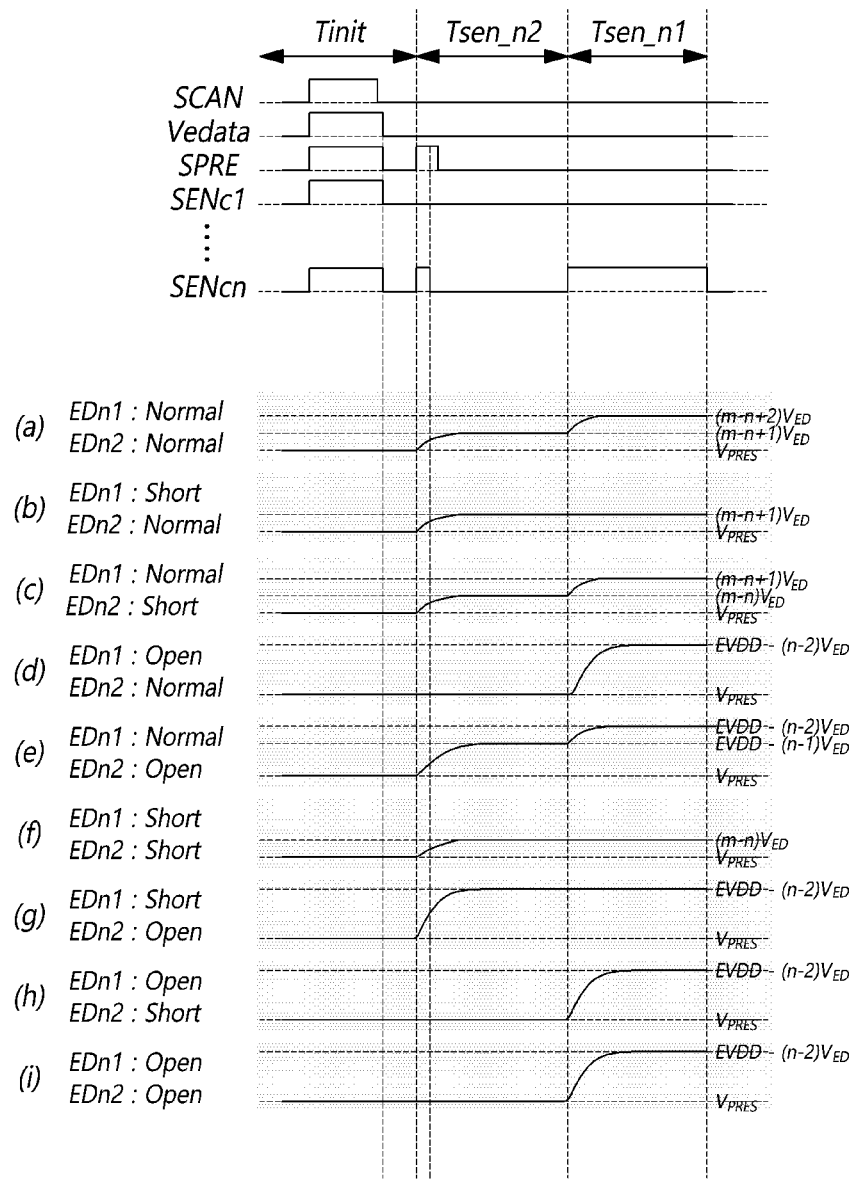

Referring to FIG. 23, the defective light source detection period may proceed in the order of the initialization period Tinit, the n2nd sensing period Tsen_n2 and the n1st sensing period Tsen_n1. In this case, whether the n2nd light source EDn2 and the n1st light source EDn1 are defective may be determined. Although not shown in FIG. 23, by a method for determining whether the n2nd light source EDn2 and the n1st light source EDn1 are defective, whether the remaining light sources ED are defective may be determined.

Assuming that the n2nd light source EDn2 and the n1st light source EDn1 are normal, referring to part (a) of FIG. 23, sensing voltages when light sources are normal may be checked. A sensing voltage may be a voltage for a light emitting node NL which is sensed through the reference voltage line RVL.

During the initialization period Tinit, a voltage for sensing may be supplied to the reference voltage line RVL. Therefore, the voltage for sensing may be sensed through the reference voltage line RVL. When the voltage for sensing is the sensing reference voltage VpreS, the sensing reference voltage VpreS may be sensed.

After the initialization period Tinit, the n2nd sensing period Tsen_n2 may proceed. During the n2nd sensing period Tsen_n2, the voltage of the n2nd light emitting node NLn2 may be sensed through the reference voltage line RVL. When the n2nd light source EDn2 is normal, the normal voltage of the n2nd light source EDn2 may be sensed through the reference voltage line RVL. The normal voltage of the n2nd light source EDn2 may be (m−n+1)V_ED. V_ED may be the threshold voltage of a light source ED.

After the n2nd sensing period Tsen_n2, the n1st sensing period Tsen_n1 may proceed. During the n1st sensing period Tsen_n1, the voltage of the n1st light emitting node NLn1 may be sensed through the reference voltage line RVL. When the n1st light source EDn1 is normal, the normal voltage of the n1st light source EDn1 may be sensed through the reference voltage line RVL. The normal voltage of the n1st light source EDn1 may be (m−n+2)V_ED. V_ED may be the threshold voltage of a light source ED.

A short or open defect may occur in a light source ED. Therefore, a light source ED may be in one of three states including normal, short, and open. When a defect occurs in a light source ED, the voltage state of a light emitting node NL may be different from that when the light emitting node NL is normal.

Referring to FIG. 23, nine cases for the states of the n2nd light source EDn2 and the n1st light source EDn1 may be checked, and are shown as parts (a) to (i) in FIG. 23.

When the n2nd light source EDn2 is normal, the sensing voltage should be (m−n+1)V_ED. However, referring to parts (c), (f) and (h) of FIG. 23, a case where a short has occurred in the n2nd light source EDn2 is illustrated. Referring to parts (c) and (f) of FIG. 23, it may be checked that the sensing voltage is (m−n)V_ED. In the case of part (h) of FIG. 23, it may be checked that the sensing voltage is the sensing reference voltage VpreS due to the open defect of the n1st light source EDn1. Also, referring to parts (e), (g) and (i) of FIG. 23, when an open occurs in the n2nd light source EDn2, it may be checked that the sensing voltage is EVDD-(n−2)V_ED. That is to say, through a difference in voltage level, whether the n2nd light source EDn2 is short-circuited and whether the n2nd light source EDn2 is open may be determined.

When the n1st light source EDn1 is normal, the sensing voltage should be (m−n+2)V_ED. However, referring to parts (b), (f) and (g) of FIG. 23, when a short occurs in the n1st light source EDn1, it may be checked that the sensing voltage is the same as the voltage sensed during the n2nd sensing period Tsen_n2. Also, referring to parts (d), (h) and (i) of FIG. 23, when an open occurs in the n1st light source EDn1, it may be checked that the sensing voltage is EVDD-(n−2)V_ED. That is to say, through a difference in voltage level, whether the n1st light source EDn1 is short-circuited and whether the n1st light source EDn1 is open may be determined.

According to the embodiments of the present disclosure described above, it is possible to provide the backlight unit 700, the display device 100 and the driving method thereof capable of specifying and detecting a defective light source in a light source array.

According to the embodiments of the present disclosure, it is possible to provide the backlight unit 700, the display device 100 and the driving method thereof capable of recycling a light source array including a defective light source.

A brief description of the embodiments of the present disclosure described above is as follows.

According to embodiments of the present disclosure, it is possible to provide a display device including a backlight unit configured to emit light to a display panel, and a data driver circuit configured to drive the backlight unit, wherein the backlight unit includes a light source array including a first light source which is electrically connected between a first light emitting node and a second light emitting node, and a light source driver circuit for driving the light source array, and wherein the light source driver circuit includes a driving transistor electrically connected between the light source array and a driving voltage node to which a driving voltage is supplied, and a sensing MUX circuit electrically connected to the first light emitting node and the second light emitting node.

The sensing MUX circuit may include a first input line electrically connected to the first light emitting node, a second input line electrically connected to the second light emitting node, a plurality of select signal lines to which select signals are supplied, and an output line electrically connected to a reference voltage line.

The sensing MUX circuit may be supplied with a sense signal, and the sensing MUX circuit may control electrical connection between the driving transistor and the reference voltage line.

The light source driver circuit may further include a scan transistor electrically connected between a data line and a first node being a gate node of the driving transistor, and a storage capacitor electrically connected between the first node and a second node of the driving transistor.

The light source array may be electrically connected between the second node of the driving transistor and a base voltage node to which a base voltage is supplied.

A magnitude of a voltage of the first light emitting node may be the same as a magnitude of a voltage of the second light emitting node.

The first light source may be a defective light source in which a defect has occurred.

The first light source may be an LED element.

A first light emitting array circuit may include the light source array and the light source driver circuit, a second light emitting array circuit may be a light emitting array circuit different from the first light emitting array circuit, and the first light emitting array circuit and the second light emitting array circuit may be driven in an active-matrix type.

The second light emitting array circuit may emit light with an intensity different from that of the first light emitting array circuit.

The data driver circuit may include an analog-to-digital converter which is electrically connected to the sensing MUX circuit through the reference voltage line.

The data driver circuit may include a digital-to-analog converter which supplies a light emitting data voltage to the light emitting array circuit through the data line.

According to embodiments of the present disclosure, it is possible to provide a backlight unit including a light source array including a first light source which is electrically connected between a first light emitting node and a second light emitting node, and a light source driver circuit for driving the light source array, wherein the light source driver circuit includes a driving transistor electrically connected between the light source array and a driving voltage node to which a driving voltage is supplied, and a sensing MUX circuit electrically connected to the first light emitting node and the second light emitting node.

The sensing MUX circuit may include a first input line electrically connected to the first light emitting node, a second input line electrically connected to the second light emitting node, a plurality of select signal lines to which select signals are supplied, and an output line electrically connected to a reference voltage line.

The light source driver circuit may further include a scan transistor electrically connected between a data line and a first node being a gate node of the driving transistor, and a storage capacitor electrically connected between the first node and a second node of the driving transistor.

A magnitude of a voltage of the first light emitting node may be the same as a magnitude of a voltage of the second light emitting node.

The first light source may be a defective light source.

The first light source may be an LED element.

A first light emitting array circuit may include the light source array and the light source driver circuit, a second light emitting array circuit may be a light emitting array circuit different from the first light emitting array circuit, and the first light emitting array circuit and the second light emitting array circuit may be driven in an active-matrix type.

According to embodiments of the present disclosure, it is possible to provide a method for driving a display device, including select signal supply step of supplying a select signal to a sensing MUX circuit which is electrically connected to a first light emitting node and a second light emitting node, input line select step of selecting a specific input line among a plurality of input lines included in the sensing MUX circuit according to the select signal, light emitting node voltage sensing step in which the sensing MUX circuit senses a voltage of a light emitting node through the specific input line, and defective light source determining step of determining whether a first light source connected between the first light emitting node and the second light emitting node included in a light source array is a defective light source, on the basis of a voltage of the first light emitting node and a voltage of the second light emitting node sensed in the light emitting node voltage sensing step.

According to embodiments of the present disclosure, it is possible to provide a display device including a backlight unit configured to emit light to a display panel, and a data driver circuit configured to drive the backlight unit, wherein the backlight unit includes a light source array including a first light source which is electrically connected between a first light emitting node and a second light emitting node, and a light source driver circuit for driving the light source array, and wherein the light source driver circuit includes a scan transistor configured to control supply of a light emitting data voltage, a driving transistor whose gate node is electrically connected to the scan transistor, a first sensing transistor electrically connected to the first light emitting node, and a second sensing transistor electrically connected to the second light emitting node.

The first sensing transistor and the second sensing transistor may be electrically connected to the same reference voltage line.

The first sensing transistor may be electrically connected to a first reference voltage line, and the second sensing transistor may be electrically connected to a second reference voltage line different from the first reference voltage line.

The first sensing transistor and the second sensing transistor may be electrically connected to the same reference voltage line, a first sense signal may be supplied to a gate node of the first sensing transistor and a gate node of a third sensing transistor, and the third sensing transistor may be electrically connected between a gate node of the second sensing transistor and a select voltage line.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims.

What is claimed is:

1. A display device comprising:
   a backlight unit configured to emit light to a display panel; and
   a data driver circuit configured to drive the backlight unit, wherein the backlight unit comprises:
      a light source array including a first light source that is electrically connected between a first light emitting node and a second light emitting node; and
      a light source driver circuit configured to drive the light source array, the light source driver circuit comprising:
         a driving transistor electrically connected between the light source array and a driving voltage node to which a driving voltage is supplied; and
         a sensing multiplexer (MUX) circuit electrically connected to the first light emitting node and the second light emitting node.

2. The display device of claim 1, wherein the sensing MUX circuit comprises:
   a first input line electrically connected to the first light emitting node;
   a second input line electrically connected to the second light emitting node;
   a plurality of select signal lines to which select signals are supplied; and
   an output line electrically connected to a reference voltage line.

3. The display device of claim 2, wherein the sensing MUX circuit is supplied with a sense signal, and the sensing MUX circuit controls electrical connections between the driving transistor and the reference voltage line.

4. The display device of claim 2, wherein the data driver circuit comprises an analog-to-digital converter that is electrically connected to the sensing MUX circuit through the reference voltage line.

5. The display device of claim 1, wherein the light source driver circuit further comprises:
   a scan transistor electrically connected between a data line and a first node that is a gate node of the driving transistor; and
   a storage capacitor electrically connected between the first node and a second node of the driving transistor.

6. The display device of claim 5, wherein the light source array is electrically connected between the second node of the driving transistor and a base voltage node to which a base voltage is supplied.

7. The display device of claim 1, wherein a magnitude of a voltage of the first light emitting node is a same as a magnitude of a voltage of the second light emitting node.

8. The display device of claim 7, wherein the first light source is a defective light source that includes a defect.

9. The display device of claim 1, wherein the first light source is a light-emitting diode (LED) element.

10. The display device of claim 1, wherein a first light emitting array circuit comprises the light source array and the light source driver circuit,
   a second light emitting array circuit is a light emitting array circuit different from the first light emitting array circuit, and
   the first light emitting array circuit and the second light emitting array circuit are driven in an active-matrix type.

11. The display device of claim 10, wherein the second light emitting array circuit emits light with an intensity that is different from an intensity of the first light emitting array circuit.

12. The display device of claim 10, wherein the data driver circuit comprises a digital-to-analog converter that supplies a light emitting data voltage to the light emitting array circuit through a data line.

13. A backlight unit comprising:
   a light source array including a first light source that is electrically connected between a first light emitting node and a second light emitting node; and
   a light source driver circuit configured to drive the light source array, wherein the light source driver circuit comprises:
      a driving transistor electrically connected between the light source array and a driving voltage node to which a driving voltage is supplied; and
      a sensing multiplexer (MUX) circuit electrically connected to the first light emitting node and the second light emitting node.

14. The backlight unit of claim 13, wherein the sensing MUX circuit comprises:
   a first input line electrically connected to the first light emitting node;
   a second input line electrically connected to the second light emitting node;
   a plurality of select signal lines to which select signals are supplied; and
   an output line electrically connected to a reference voltage line.

15. The backlight unit of claim 13, wherein the light source driver circuit further comprises:
   a scan transistor electrically connected between a data line and a first node that is a gate node of the driving transistor; and
   a storage capacitor electrically connected between the first node and a second node of the driving transistor.

16. The backlight unit of claim 13, wherein a magnitude of a voltage of the first light emitting node is a same as a magnitude of a voltage of the second light emitting node.

17. The backlight unit of claim 16, wherein the first light source is a defective light source.

18. The backlight unit of claim 13, wherein the first light source is a light emitting diode (LED) element.

19. The backlight unit of claim 13, wherein a first light emitting array circuit comprises the light source array and the light source driver circuit,
   a second light emitting array circuit is a light emitting array circuit different from the first light emitting array circuit, and
   the first light emitting array circuit and the second light emitting array circuit are driven in an active-matrix type.

20. A method for driving a display device, comprising:
   performing a select signal supply step of supplying a select signal to a sensing multiplexer (MUX) circuit that is electrically connected to a first light emitting node and a second light emitting node;
   performing an input line select step of selecting a specific input line among a plurality of input lines included in the sensing MUX circuit according to the select signal;
   performing a light emitting node voltage sensing step in which the sensing MUX circuit senses a voltage of a light emitting node through the specific input line; and
   performing a defective light source determining step of determining whether a first light source connected between the first light emitting node and the second light emitting node included in a light source array is a defective light source, based on a voltage of the first light emitting node and a voltage of the second light emitting node sensed in the light emitting node voltage sensing step.

21. A display device comprising:
a backlight unit configured to emit light to a display panel; and
a data driver circuit configured to drive the backlight unit, wherein the backlight unit comprises:
   a light source array including a first light source which is electrically connected between a first light emitting node and a second light emitting node; and
   a light source driver circuit configured to drive the light source array, the light source driver circuit comprising:
      a scan transistor configured to control supply of a light emitting data voltage;
      a driving transistor including a gate node that is electrically connected to the scan transistor;
      a first sensing transistor electrically connected to the first light emitting node; and
      a second sensing transistor electrically connected to the second light emitting node.

22. The display device of claim 21, wherein the first sensing transistor and the second sensing transistor are electrically connected to a reference voltage line.

23. The display device of claim 21, wherein the first sensing transistor is electrically connected to a first reference voltage line, and the second sensing transistor is electrically connected to a second reference voltage line that is different from the first reference voltage line.

24. The display device of claim 21, wherein the first sensing transistor and the second sensing transistor are electrically connected to a reference voltage line,
   a first sense signal is supplied to a gate node of the first sensing transistor and a gate node of a third sensing transistor, and
   the third sensing transistor is electrically connected between a gate node of the second sensing transistor and a select voltage line.

* * * * *